US012602930B2

(12) United States Patent
Kandabhattu et al.

(10) Patent No.: US 12,602,930 B2
(45) Date of Patent: Apr. 14, 2026

(54) METHOD AND SYSTEM FOR CONTINUOUSLY TRACKING HUMANS IN AN AREA

(71) Applicant: INFOSYS LIMITED, Bangalore (IN)

(72) Inventors: Sairam Kandabhattu, Bangalore (IN); Puranjoy Bhattacharya, Bangalore (IN); Renjith Suchitra Devi, Bangalore (IN)

(73) Assignee: Infosys Limited, Bangalore (IN)

( * ) Notice: Subject to any disclaimer, the term of this patent is extended or adjusted under 35 U.S.C. 154(b) by 283 days.

(21) Appl. No.: 18/236,806

(22) Filed: Aug. 22, 2023

(65) Prior Publication Data

US 2025/0005932 A1    Jan. 2, 2025

(30) Foreign Application Priority Data

Jun. 29, 2023    (IN) ............................. 202341043631

(51) Int. Cl.
*G06V 20/52* (2022.01)
*G06V 40/10* (2022.01)

(52) U.S. Cl.
CPC ............ *G06V 20/53* (2022.01); *G06V 40/103* (2022.01); *G06V 2201/07* (2022.01)

(58) Field of Classification Search
CPC .. G06V 20/53; G06V 40/103; G06V 2201/07; G06V 20/52
USPC ......................................... 382/103, 115, 104
See application file for complete search history.

(56) References Cited

U.S. PATENT DOCUMENTS

| | | | |
|---|---|---|---|
| 10,891,741 B2 * | 1/2021 | Saleemi ............... | G06V 10/255 |
| 2019/0130189 A1 * | 5/2019 | Zhou ................... | G06V 10/7515 |
| 2022/0383522 A1 * | 12/2022 | Lai ........................... | G06T 7/223 |
| 2023/0186640 A1 * | 6/2023 | Kocamaz ................ | G06T 7/246 |
| | | | 382/104 |

FOREIGN PATENT DOCUMENTS

CN          114882073 A  *  8/2022  ............. G06V 10/82

* cited by examiner

*Primary Examiner* — Kathleen Y Dulaney
(74) *Attorney, Agent, or Firm* — Finnegan, Henderson, Farabow, Garrett & Dunner, LLP

(57) ABSTRACT

The disclosure relates to system and method for continuously tracking humans in an area. The method includes receiving video data of the area from overhead cameras. Each of overhead cameras includes Field of View (FoV), FoV includes overlapping region and non-overlapping region, and overlapping region corresponds to region of intersection between at least two FoVs. The method further includes detecting presence humans in first FoV through object detection and classification models; for each human of humans, assigning unique global identity (ID) corresponding to human in first FoV, and reassigning unique global ID to human when human moves from first FoV to second FoV through overlapping region between first FoV and second FoV using weighted combination of resource assignment algorithm, intersection-over-union (IOU) based track detection, and velocity and direction estimation of subsequent frame of video data; and continuously tracking, in real-time, each of humans in the area through unique global ID.

20 Claims, 15 Drawing Sheets

100
| Computing Device 102 | Communication Network 106 | Camera(s) 104 |
FIG. 1

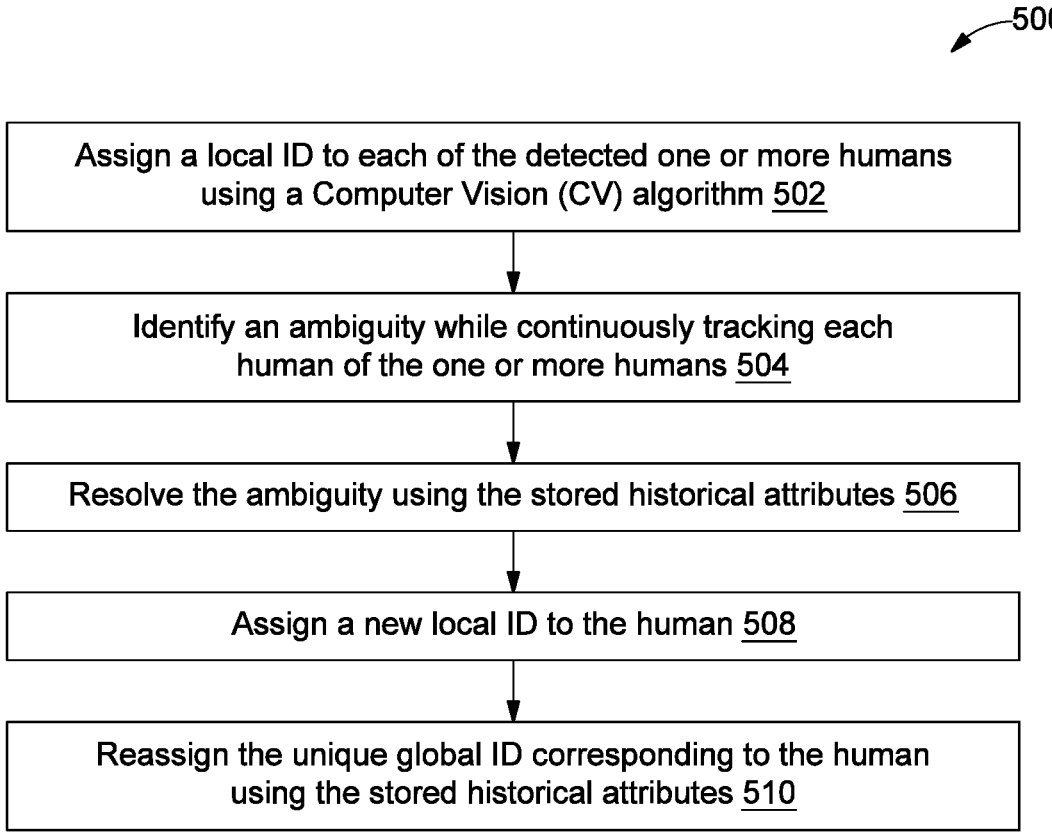

500

Assign a local ID to each of the detected one or more humans using a Computer Vision (CV) algorithm 502

Identify an ambiguity while continuously tracking each human of the one or more humans 504

Resolve the ambiguity using the stored historical attributes 506

Assign a new local ID to the human 508

Reassign the unique global ID corresponding to the human using the stored historical attributes 510

FIG. 5

METHOD AND SYSTEM FOR CONTINUOUSLY TRACKING HUMANS IN AN AREA

CROSS-REFERENCE TO RELATED APPLICATION

This application claims priority to Indian patent application No. 202341043631, filed on Jun. 29, 2023, which is hereby incorporated by reference in its entirety.

TECHNICAL FIELD

The present disclosure relates to surveillance systems, and more particularly to a system and method for continuously tracking humans in an area.

BACKGROUND

Typically, surveillance systems are designed to monitor and record events in specific spaces or environments. The surveillance systems mainly include cameras, sensors, and other components to obtain visual data. The purpose of surveillance systems is to prevent possible risks, identify events, and provide data for investigations. Conventionally, the surveillance systems relied on human operators to monitor video feeds. However, with advancements in Computer Vision (CV), automation, and Artificial Intelligence (AI), the surveillance systems have become more intelligent and capable of performing tasks automatically. The integration of CV with the surveillance systems has transformed the abilities of the surveillance systems. The CV plays a fundamental role in object detection and tracking, facial recognition, behavior analysis, video analytics, and anomaly detection.

However, the existing surveillance systems with the integrated CV face challenges in terms of continuously tracking people or objects and maintaining their identity across each point of detection as affected by some factors such as limited viewpoints (when a camera arrangement is not able to capture all relative information), complex scenarios (in case of crowded places where multiple people and objects are present), and background clutter (in case of overlapping people or objects when the people or the objects present in close proximity). Tracking is one of the profound areas of research in fields of the CV due to some reasons including identity switching between similar appearance people or objects, identity loss due to incorrect detection and classification of the people or the objects, and creation of a new identity of a person or an object whose original identity has been lost. By way of an example, in retail domain applications such as automated check outs using the CV, tracking of the people and the objects becomes necessity as the objects (mainly products) need to be associated with the right people and to be added to their respective shopping carts.

The present invention is directed to overcome one or more limitations stated above or any other limitations associated with the known arts.

SUMMARY

In one embodiment, a method of continuously tracking humans in an area is disclosed. In one example, the method may include receiving video data of the area from a plurality of overhead cameras. It should be noted that each of the plurality of overhead cameras may include a Field of View (FoV), the FoV may include an overlapping region and a non-overlapping region, and the overlapping region may correspond to a region of intersection between at least two FoVs. The method may further include detecting presence of one or more humans in a first FoV through object detection and classification models. The method may further include, for each human of the one or more humans, assigning a unique global identity (ID) corresponding to the human in the first FoV. The method may further include, for each human of the one or more humans, reassigning the unique global ID to the human when the human moves from the first FoV to a second FoV through an overlapping region between the first FoV to the second FoV using a weighted combination of resource assignment algorithm, intersection-over-union (IOU) based track detection, and velocity and direction estimation of a subsequent frame of the video data. The method may further include continuously tracking, in real-time, each of the one or more humans in the area through the unique global ID.

In another embodiment, a system for continuously tracking humans in an area is disclosed. In one example, the system may include a processing circuitry and a memory communicatively coupled to the processing circuitry. The memory may store processor-executable instructions, which, on execution, may cause the processing circuitry to receive video data of an area from a plurality of overhead cameras. It should be noted that each of the plurality of overhead cameras may include a Field of View (FoV), the FoV may include an overlapping region and a non-overlapping region, and the overlapping region may correspond to a region of intersection between at least two FoVs. The processor-executable instructions, on execution, may further cause the processing circuitry to detect presence of one or more humans in a first FoV through object detection and classification models. The processor-executable instructions, on execution, may further cause the processing circuitry to, for each human of the one or more humans, assign a unique global identity (ID) corresponding to the human in the first FoV. The processor-executable instructions, on execution, may further cause the processing circuitry to, for each human of the one or more humans, reassign the unique global ID to the human when the human moves from the first FoV to a second FoV through an overlapping region between the first FoV and the second FoV using a weighted combination of resource assignment algorithm, intersection-over-union (IOU) based track detection, and velocity and direction estimation of a subsequent frame of the video data. The processor-executable instructions, on execution, may further cause the processing circuitry to continuously track in real-time each of the one or more humans in the area through the unique global ID.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 1 illustrates a block diagram of an environment for continuously tracking humans in an area, in accordance with an exemplary embodiment of the present disclosure.

FIG. 5 illustrates a flow diagram of an exemplary process for assigning IDs to humans while tracking the humans in the area, in accordance with some embodiments of the present disclosure.

DETAILED DESCRIPTION

Figure 2:
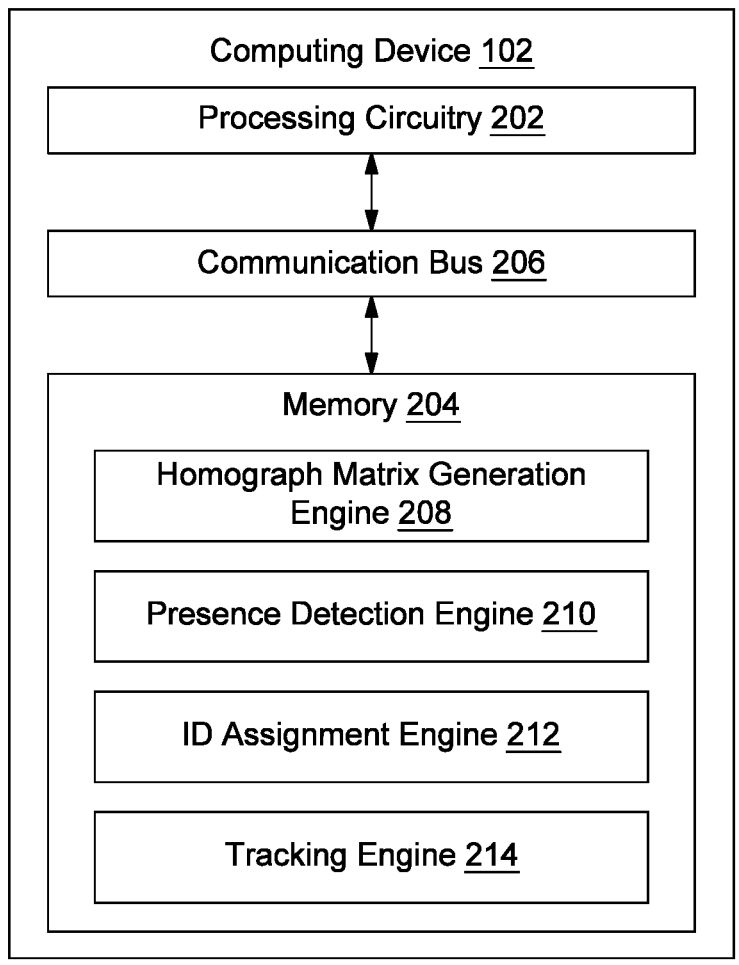
FIG. 2 illustrates a block diagram of various engines within a computing device configured for continuously tracking humans in an area, in accordance with some embodiments of the present disclosure.

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

FIG. 1 is a block diagram that illustrates an environment 100 for continuously tracking humans in an area, in accordance with an exemplary embodiment of the present disclosure. The environment 100 may include a computing device 102, and a plurality of camera(s) 104.

The computing device 102 and the plurality of camera(s) 104 are configured to communicate with each other via a communication network 106 for sending and receiving various data. Examples of the communication network 106 may include, but are not limited to, a wireless fidelity (Wi-Fi) network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, and a combination thereof.

Examples of the computing device 102 may include, but are not limited to devices with high computing GPUs, a server, a smartphone, an application server, a laptop, a desktop, a mobile phone, a smart wearable, or the like. The computing device 102 may be configured to continuously track humans in the area. Further, to track the humans, the computing device 102 may perform various operations. For example, the operations may include, receiving video data, detecting presence of the humans, assigning identities (IDs) to the humans, generating homographic matrices corresponding to Field of Views (FoVs) of the plurality of camera(s) 104, presenting the humans on a combined homograph matrix, identifying heads of the humans, identifying persons, associating the heads with the persons, identifying ambiguities, resolving the ambiguities, and the like.

By way of an example, in some embodiments, the computing device 102 may receive information from the plurality of camera(s) 104. For example, the computing device 102 may receive the video data from the plurality of camera(s) 104. The plurality of camera(s) 104 may continuously capture the video data in the area. It should be noted that the plurality of camera(s) 104 corresponds to overhead cameras mounted vertically on a surface (for example, mounted on a ceiling). By way of an example, the plurality of camera(s) is mounted on the ceiling in a way ceiling fans are mounted. Further, each of the plurality of camera(s) 104 includes a FoV. The FoV may include one or more overlapping regions and a non-overlapping region. An overlapping region corresponds to a region of intersection between at least two FoVs. In other words, the overlapping region is a common region between the at least two FoVs. With regards to cameras, the overlapping region is covered by two or more cameras. In some embodiments, the video data captured by the plurality of camera(s) 104 may be transmitted to the computing device 102 through the communication network 106.

The computing device 102 may further include a database (not shown in FIG. 1), which may store information such as global IDs, local IDs, attributes of humans, video data, homograph matrices etc. Further, the computing device 102 may be used by a user or an administrator to access the system 100, to receive notifications upon identification of ambiguities, receive recommendations, or to provide inputs.

The computing device 102 may include a display which further includes a user interface (not shown in FIG. 1). By way of an example, the display may be used to display the video data of the area, or to present each of the detected one or more humans on the combined homograph matrix using homographic transformation in real-time, to the user or the administrator. In some embodiments, the display may display, in real-time, the video data captured by the plurality of camera(s) 104. In some other embodiments, the display may display, in real-time, video data captured by some of the plurality of camera(s) 104. For example, consider a scenario that, in a space or the area, there are a total of five camera(s). In that case, the display of the computing device 102 may display video data captured by the five camera by default.

By way of an example, the user interface of the display may be used by the user or the administrator to provide inputs to the computing device 102. Further, when user or the administrator provides an input to the computing device 102 to display video data of one of the five camera, in that case the video data corresponding to only that camera may be displayed. Additionally, in some embodiments, the computing device 102 provides an option to the user or the administrator to see an enlarged view of a particular video by selecting that video. For example, footage from each camera of the cameras may be displayed on a single screen by default. When the user or the administrator clicks on a section of the one of the five camera, a corresponding video may be enlarged. Moreover, functionalities of the computing device 102 are further explained in detail in conjunction with FIG. 2.

FIG. 2 is a block diagram of various engines within the computing device 102 configured for continuously tracking the humans in the area, in accordance with an exemplary embodiment of the present disclosure. FIG. 2 is explained in conjunction with FIG. 1. The computing device 102 may include a processing circuitry 202, and a memory 204 communicatively coupled to the processing circuitry 202 via a communication bus 206.

The memory 204 may store various data that may be captured, processed, and/or required by the computing device 102. The memory 204 may be a non-volatile memory (e.g., flash memory, Read Only Memory (ROM), Programmable ROM (PROM), Erasable PROM (EPROM), Electrically EPROM (EEPROM) memory, etc.) or a volatile memory (e.g., Dynamic Random Access Memory (DRAM), Static Random-Access memory (SRAM), etc.)

The memory 204 may also store processor-executable instructions. The processor-executable instructions, when executed by the processing circuitry 202, may cause the processing circuitry 202 to implement one or more embodiments of the present disclosure such as, but not limited to, receiving video data of the area, detecting presence of humans, assigning IDs, generating homograph matrices, identifying heads and persons corresponding to the humans, associating the heads with the persons, presenting the humans on a combined homograph matrix, and the like. The memory 204 may include a homograph matrix generation engine 208, a presence detection engine 210, an ID assignment engine 212, and a tracking engine 214. The memory 204 may also include a data store (not shown in FIG. 2) for storing data and intermediate results generated by the engines 208-214. For example, attributes of each of one or more humans, and integrated data (as explained further in FIG. 10) may be stored in the data store. The attributes may include spatial attributes and temporal attributes.

The homograph matrix generation engine 208 in conjunction with the processing circuitry 202 may be configured to generate a plurality of homograph matrices corresponding to a plurality of overhead cameras (such as the plurality of camera(s) 104). For example, one homograph matrix may be generated corresponding to each of the plurality of overhead cameras. The plurality of overhead cameras may be mounted vertically on a ceiling surface in the area at a constant height from floor. It may be noted that the plurality of overhead cameras may be arranged in a regular grid to span the entire floor space. As will be appreciated, the solution is scalable to arbitrarily large floor areas. The plurality of overhead cameras may be employed to capture video data of the area. It should be noted that each of the plurality of overhead cameras may include an FoV. The FoV may include an overlapping region and a non-overlapping region. Here, the overlapping region corresponds to a region of intersection between at least two FoVs. Positioning of each of the plurality of overhead cameras may ensure a pre-determined amount of overlap with adjacent FoVs. The overlapping areas may have edges parallel to rectangular FoVs. Further, it should be noted that the plurality of homograph matrices may include a representation of the FoV of each of the plurality of overhead cameras. Additionally, the homograph matrix generation engine 208 in conjunction with the processing circuitry 202 may be configured to combine the plurality of homograph matrices. As a result, a combined homograph matrix may be obtained.

Further, the presence detection engine 210 in conjunction with the processing circuitry 202 may be configured to detect presence of the one or more humans in a FoV. In particular, the presence detection engine 210 may include object detection and classification models for detecting the presence of one or more humans. In some embodiments, a head of each of the one or more humans and an associated head bounding box may be identified by the presence detection engine 210 using the object detection and classification models. In some other embodiments, a person corresponding to each of the one or more humans and an associated person bounding box may be identified by the presence detection engine 210 using the object detection and classification models. Further, the head may be associated with the person. As a result, presence of a human may be detected when a centroid of the head bounding box is within the person bounding box on the combined homograph matrix. The presence detection engine 210 may also identify a set of key points corresponding to each of the one or more humans.

The homograph matrix generation engine 208 may also be configured for presenting the head bounding box, and the person bounding box on the combined homograph matrix. Also, upon detection of presence of the one or more humans, the homograph matrix generation engine 208 may present each of the detected one or more humans on the combined homograph matrix using homographic transformation. It should be noted that each of the head bounding box and the person bounding box is dynamically adjustable based on motion of an associated human.

In some embodiments, the ID assignment engine 212 in conjunction with the processing circuitry 202 may be configured for assigning a unique global ID corresponding to the human in the first FoV, for each human of the one or more humans. The unique global ID may be assigned to the human upon entering FoVs of the plurality of overhead cameras through regions in the FoVs marked as entrance. Further, in some embodiments, the ID assignment engine 212 may reassign the unique global ID to the human when the human moves from one FoV to another FoV through an overlapping region between the FoVs. It means the same unique global ID may be retained across different FoVs. It should be noted that a weighted combination of a resource assignment algorithm (e.g., Hungarian assignment algorithm), an intersection-over-union (IOU) based track detection, and velocity and direction estimation of a subsequent frame of the video data may be used 9eassignn global ID. Additionally, the ID assignment engine 212 may assign a local ID to each of the detected one or more humans. The local ID may be assigned using a Computer Vision (CV) algorithm. It should be noted that the local ID of an individual human is different in each of the one or more FoVs. The global ID may be assigned to a human at a predetermined entrance or prior crossing the predetermined entrance. The local ID may be assigned to the human when the human enters a FoV. The local ID of the human changes with change in FoV, however, the global ID of the human remains same throughout the FoVs once assigned at a predetermined entrance or prior crossing the predetermined entrance. The same global ID is reassigned when the FoV is changed.

In some embodiments, the tracking engine 214 in conjunction with the processing circuitry 202 may be configured for continuously tracking in real-time each of the one or more humans in the area through the unique global ID. In some embodiments, the tracking engine 214 may be responsible for identifying an ambiguity while continuously tracking each human of the one or more humans. The ambiguity may correspond to one of human within a proximity threshold with another of the one or more humans, or loss of the local ID of the human due to an error or failure of the CV algorithm. Upon detection of the ambiguity, the tracking engine 214 may resolve the ambiguity using the stored attributes of each of one or more humans. It should be noted that when the ambiguity corresponds to the loss of the local ID of the human, the tracking engine 214 may send a signal to the ID assignment engine 212. The ID assignment engine 212 may further assign a new local ID to the human. It should be noted that the new local ID may be assigned through the CV algorithm, which is internally updated in the spatial and temporal attributes. Also, the unique global ID may be reassigned to the human using the stored attributes. The attributes may be stored in a continuously maintained data structure. The data structure may include attributes such as, but not limited to, time of entry, status (live or exited), time of exit, current FoV (or FoVs), position in current FoV (or FoVs), location of bounding box in current FoV (or FoVs), motion vector characterizing movement of bounding box in current FoV, appearance vector characterizing visual appearance of bounding box in current FoV, position on the global floor space, etc.

It should be noted that all such aforementioned engines 208-214 may be represented as a single module or a combination of different modules. Further, as will be appreciated by those skilled in the art, each of the engines 208-214 may reside, in whole or in parts, on one device or multiple devices in communication with each other. In some embodiments, each of the engines 208-214 may be implemented as dedicated hardware circuit comprising custom application-specific integrated circuit (ASIC) or gate arrays, off-the-shelf semiconductors such as logic chips, transistors, or other discrete components. Each of the engines 208-214 may also be implemented in a programmable hardware device such as a field programmable gate array (FPGA), programmable array logic, programmable logic device, and so forth. Alternatively, each of the engines 208-214 may be implemented in software for execution by various types of processors (e.g., the processing circuitry 202). An identified module of executable code may, for instance, include one or more physical or logical blocks of computer instructions, which may, for instance, be organized as an object, procedure, function, or other construct. Nevertheless, the executables of an identified module or component need not be physically located together, but may include disparate instructions stored in different locations which, when joined logically together, include the module and achieve the stated purpose of the module. Indeed, a module of executable code could be a single instruction, or many instructions, and may even be distributed over several different code segments, among different applications, and across several memory devices.

As will be appreciated by one skilled in the art, a variety of processes may be employed for continuously tracking humans in an area. For example, the exemplary computing device 102 may track the humans by the processes discussed herein. In particular, as will be appreciated by those of ordinary skill in the art, control logic and/or automated routines for performing the techniques and steps described herein may be implemented by the computing device 102 either by hardware, software, or combinations of hardware and software. For example, suitable code may be accessed and executed by the one or more processors on the computing device 102 to perform some or all of the techniques described herein. Similarly, application specific integrated circuits (ASICs) configured to perform some or all of the processes described herein may be included in the one or more processors on the computing device 102.

Figure 3:
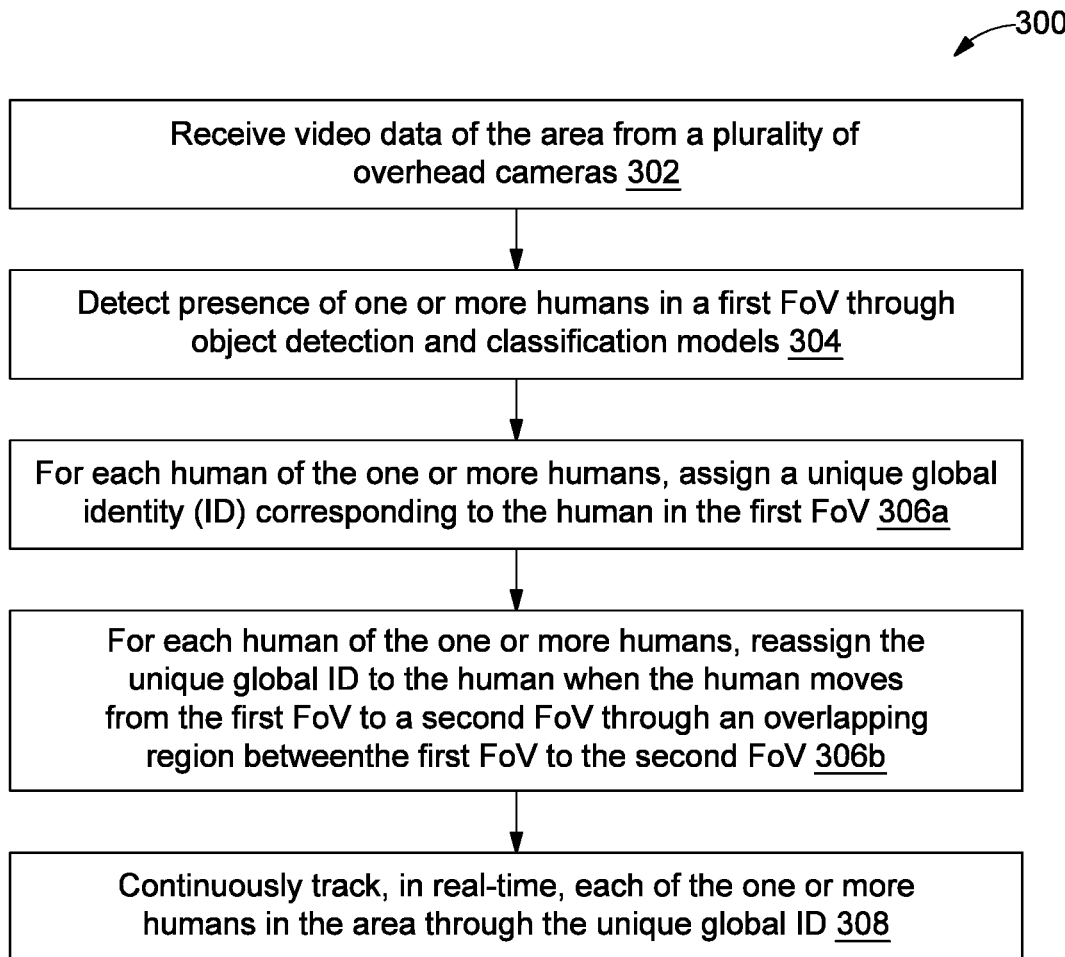
FIG. 3 illustrates a flow diagram of an exemplary process for continuously tracking humans in an area, in accordance with some embodiments of the present disclosure.

FIG. 3 is a flow diagram 300 that depicts an exemplary process for continuously tracking humans in an area, in accordance with an exemplary embodiment of the present disclosure. Each step of the process may be executed by a computing device (such as the computing device 102). FIG. 3 is explained in conjunction with FIGS. 1-2.

At step 302, video data of the area may be received from a plurality of overhead cameras (such as the plurality of camera(s) 104). Each of the plurality of overhead cameras may mounted vertically in the area. It should be noted that the each of the plurality of overhead cameras may include a Field of View (FoV). The FoV may include an overlapping region and a non-overlapping region. The overlapping region corresponds to a region of intersection between at least two FoVs.

At step 304, presence of one or more humans may be detected in a first FoV through object detection and classification models. A presence detection engine (for example, the presence detection engine 210) may be employed to perform this step. The first FoV may be associated with a first camera of the plurality of cameras. In some embodiments, a set of key points corresponding to each of the one or more humans may be identified using an appearance-based model. Examples of the key points may include, but are not limited to, shoulder, an elbow, a wrist, a knee, an ankle, and the like. In some embodiments, attributes of each of the one or more humans may be stored. The attributes may include spatial attributes and temporal attributes. In other words, data of the one or more humans across both space and time may be collected. For example, shipping movements of the one or more humans across the area over time may be stored. Further, steps of detection of the presence of one or more humans are explained in detail in conjunction with FIG. 4.

Thereafter, at step 306a, a unique global identity (ID) may be assigned corresponding to the human in the first FoV, using an ID assignment engine (such as the ID assignment engine 212). The unique global ID may be assigned to each human of the one or more humans entering the area. By way of an example, the area may have one entrance and a corresponding predetermined entrance region in the FoV of the camera covering the entrance. A human may be assigned the global ID at the predetermined entrance or prior to entering the predetermined entrance.

At step 306b, the unique global ID may be reassigned to the human when the human moves from the first FoV to a second FoV through an overlapping region between the first FOV and the second FoV, using the ID assignment engine. In other words, the global ID assigned remains same for the human throughout the area, even if the FoVs change. For example, when a FoV changes from the first FoV to the second FoV, a global ID assigned in the first FoV may be assigned again in the second FoV. For reassigning the global ID, a weighted combination of a resource assignment algorithm (e.g., Hungarian assignment algorithm), an intersection-over-union (IOU) based track detection, the appearance-based model, and velocity and direction estimation of a subsequent frame of the video data may be used. At step 308, each of the one or more humans may be tracked continuously in the area through the unique global ID, by a tracking engine (such as the tracking engine 214). It should be noted that to continuously track in real-time, each of the one or more humans in the area, the process may further include tracking, by the tracking engine, the human based on the unique global ID when the human is in a non-overlapping region, using a combination of the IOU based track detection, the appearance-based model, and the velocity and direction estimation of a subsequent frame of the video data. Additionally, to continuously track in real-time, each of the one or more humans in the area, the process may further include reassigning, by the tracking engine, the unique global ID to the human when the human moves through an overlapping region between two of a plurality of FoVs corresponding to the plurality of overhead cameras, using the weighted combination of the resource assignment algorithm, the IOU based track detection, and the velocity and direction estimation of a subsequent frame of the video data.

Figure 4:
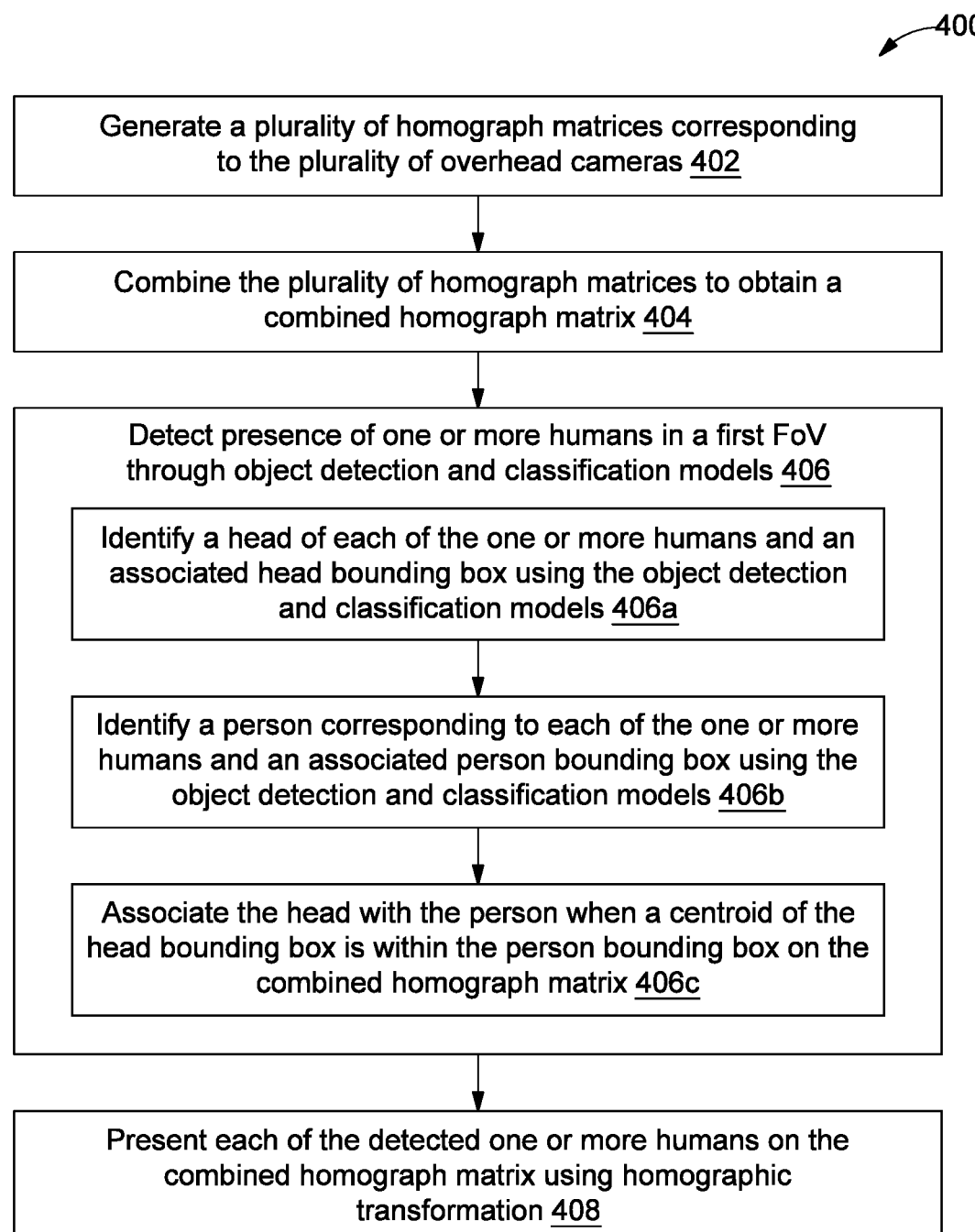
FIG. 4 illustrates a flow diagram of an exemplary process for presenting the detected humans on a combined homograph matrix, in accordance with some embodiments of the present disclosure.

FIG. 4 is a flow diagram 400 that depicts an exemplary process for presenting the detected humans on a combined homograph matrix, in accordance with an exemplary embodiment of the present disclosure. Each step of the process may be executed by a homograph generation engine of the computing device (for example, the computing device 102). FIG. 4 is explained in conjunction with FIGS. 1-3.

At step 402, a plurality of homograph matrices corresponding to the plurality of overhead cameras may be generated, using the homograph generation engine (for example, the homograph generation engine 208). It should be noted that each of the plurality of homograph matrices may be used to project a representation of the FoV of each of the plurality of overhead cameras. The homographic matrices are transformations (3×3 matrices) that map points in one image to corresponding points in another image, and are further illustrated in FIGS. 11A-11D. At step 404, the plurality of homograph matrices may be combined. As a result of combination of the plurality of homograph matrices, a combined homograph matrix may be obtained.

At step 406, presence of the one or more humans in the first FoV through object detection and classification models may be detected using the homograph generation engine and the presence detection engine (such as the homograph generation engine 208 and the presence detection engine 210). Detecting the presence of the one or more humans may include further sub-steps 406a to 406c. At step 406a, a head of each of the one or more humans and an associated head bounding box may be identified. At step 406b, a person corresponding to each of the one or more humans and an associated person bounding box may be identified. The object detection and classification models may be used for identifying the head and the person. Further, at step 406c, the head may be associated with the person when a centroid of the head bounding box is within the person bounding box on the combined homograph matrix. It should be noted that each of the head bounding box and the person bounding box may be dynamically adjustable based on motion of an associated human.

At step 408, each of the detected one or more humans may be presented on the combined homograph matrix using homographic transformation, in real-time. This step may be performed using the homograph generation engine. To present the detected one or more humans, in particular, the head bounding box and the person bounding box may be presented on the combined homograph matrix.

FIG. 5 is a flow diagram 500 that depicts an exemplary process for assigning IDs to the humans while tracking the humans in the area, in accordance with an exemplary embodiment of the present disclosure. Each step of the process may be executed by the ID assignment engine and the tracking engine (such as the ID assignment engine 212 and the tracking engine 214). FIG. 5 is explained in conjunction with FIGS. 1-4.

At step 502, a local ID may be assigned to each of the detected one or more humans. It should be noted that each of the detected one or more humans may be used for assigning the local ID. This step may be performed using the ID assignment engine. It should be noted that the local ID of an individual human may be different for each of the one or more FoVs. With reference to the previous example of the area with one entrance, for example, the local ID may be assigned to a human whenever the human is detected in a first FOV for that first FoV only. Thereafter, if the human enters a new FoV, the local ID may change automatically or may be assigned again. In other words, the local ID of the human changes with the change in FoV. Thus, the global ID is different from the local ID as the global ID always remains same throughout all the FoVs once assigned to the human.

By way of an example, consider that the area includes three cameras, and one entrance. Further, when the human enters the area, initially a global ID '25' and a local ID '6' corresponding to a first FoV of a first camera present at the entrance may be assigned. When the human moves forward from the first FoV to a second FoV of the a second camera. The same global ID '25' may be assigned/reassigned, but a new local ID '3' may be assigned to the human. Further, when the human enters a third FoV corresponding to a third camera from the second FoV. At that time, the same global ID '25' may be assigned/reassigned to the human and a new local ID '10' may be assigned to the human.

By way of another example, consider a scenario that a space or the area may include five cameras and two entrances. A first camera may be present at a first entrance and a third camera may be present at a second entrance. In such a scenario, each of the entrances may include a predetermined region marked for entrance in the corresponding FoV, for example, the first entrance includes a first predetermined entrance region in a first FoV (corresponding to the first camera), and the second entrance includes a second predetermined entrance region in a third FoV (corresponding to the third camera). When a human 'A' enters from the first entrance, a global ID '14' and a local ID '2' corresponding to the first FoV of the first camera may be assigned to the human 'A'. It should be noted that the local ID '2' may be assigned to the human 'A' at the time of detection of the human 'A' in the first FoV, and the global ID '14' may be assigned to the human 'A' at the first predetermined entrance or prior crossing the first predetermined entrance. Further, as the human 'A' moves in different FoVs of the five cameras, the local ID of the human 'A' may change from '2', but the global ID '14' remains same. In other words, the local ID of a human may be maintained from a time of entering an FoV until the human exits the FoV. Therefore, when the human 'A' enters a second FoV a new local ID may be assigned to the human 'A' for the second FoV but the global ID is '14' until the human 'A' leaves the area through regions corresponding to exit regions in one or more FoVs. Similarly, when a human 'B' enters from the second entrance, a global ID '24' and a local ID '8' corresponding to a third FoV corresponding to the third camera may be assigned to the human 'B'. It should be noted that the local ID '8' may be assigned to the human 'B' whenever the human 'B' is detected in the third FoV, and the global ID '24' may be assigned to the human 'B' at the second predetermined entrance or prior crossing the second predetermined entrance. Further, as the human 'B' moves in different FoVs of the five cameras, the local ID '8' of the human 'B' may change, but the global ID '24' may remain same. These scenarios are explained for ease of explanation, however there may be other complex scenarios where the invention may be applicable, for example, an area with large number of cameras.

Further, at step 504, an ambiguity may be identified while continuously tracking each human of the one or more humans using the tracking engine. In some embodiments, the ambiguity may correspond to one of the human within a proximity threshold with another of the one or more humans. Additionally, in some embodiments, the ambiguity may correspond to loss of the local ID of the human due to an error or failure of the CV algorithm. At step 506, the ambiguity may be resolved using the stored attributes. As explained earlier, attributes of each of the one or more humans may be stored in a database. The attributes may include spatial attributes and temporal attributes. In other words, data of the one or more humans across both space and time may be collected. Shipping movements of the one or more humans across the area over time may be stored.

Further, when the ambiguity corresponds to the loss of the local ID of the human, steps 508-510 may be executed. At step 508, a new local ID may be assigned to the human. Thereafter, at step 510, the unique global ID may be reassigned corresponding to the human using the stored attributes.

Figure 6:
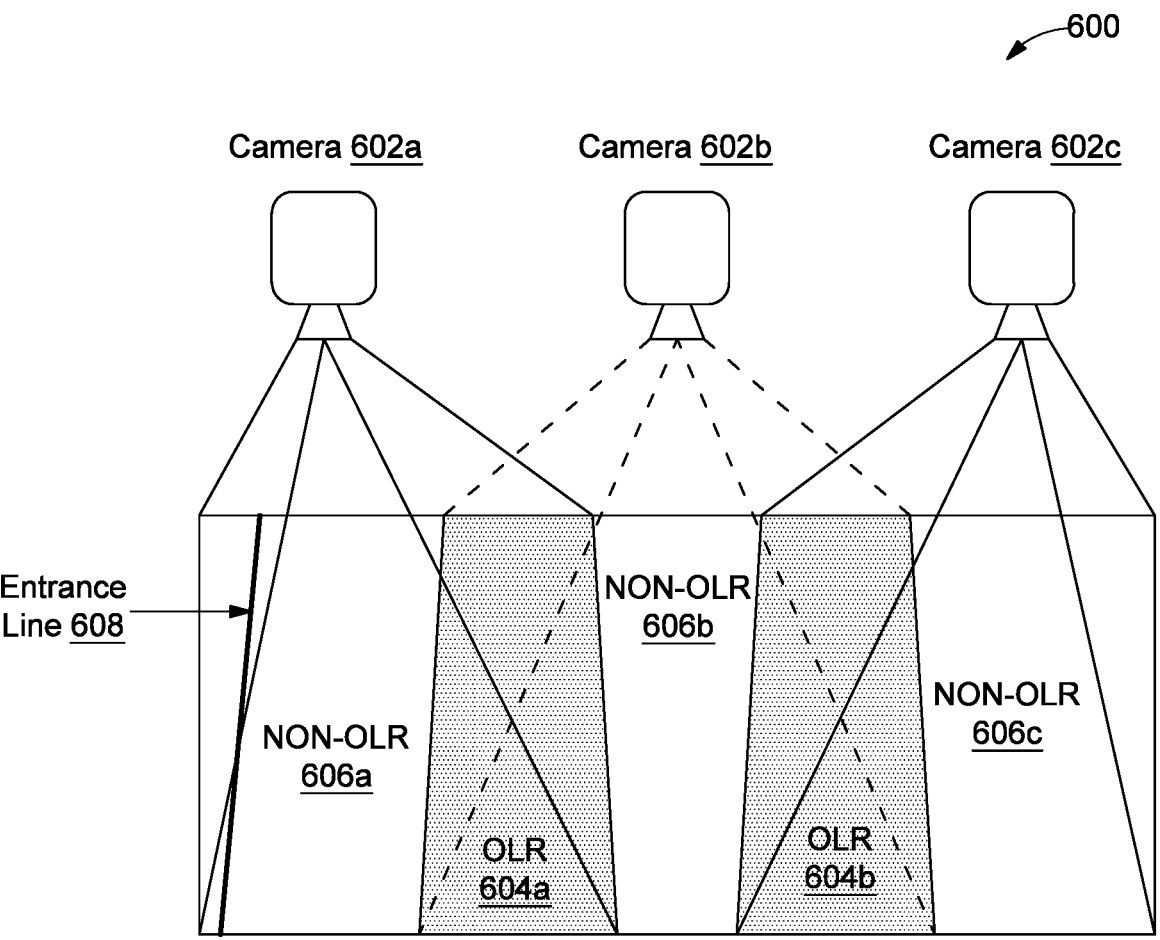
FIG. 6 illustrates an exemplary system representing Field of Views (FoVs) of three cameras, in accordance with some embodiments of the present disclosure.

FIG. 6 is an exemplary system 600 that depicts FoVs of three cameras in an area, in accordance with an exemplary embodiment of the present disclosure. FIG. 6 is explained in conjunction with FIGS. 1-5. The system 600 includes a camera 602*a*, a camera 602*b*, and a camera 602*c*. Each of the cameras 602*a*, 602*b*, and 602*c* is mounted vertically capturing a scenario of the area from top. The camera 602*a* may have a first FoV which includes an overlapping region (OLR) 604*a*, and a non-OLR 606*a*. The camera 602*b* may have a second FoV which includes the OLR 604*a*, an OLR 604*b*, and a non-OLR 606*b*. The camera 602*c* may have a third FoV which includes the OLR 604*b*, and a non-OLR 606*c*. As an OLR corresponds to a region of intersection between at least two FoVs, it may be noted that the OLR 604*a* is a region of intersection between the first FoV and the second FoV, and the OLR 604*b* is a region of intersection between the second FOV and the third FoV.

Further, a predetermined entrance 608 is depicted in the system 600. At the entrance 608 or prior crossing the entrance 608, a human may be assigned a global ID. The global ID assigned to the human may be always same throughout the first FoV, second FoV, and the third FoV, or the same global ID may be assigned whenever the FoV changes from the first FoV to the second FoV or the third FoV. On the other hand, a local ID is assigned to the human when the human is detected in a FoV. Thus, the local ID assigned to the human in the first FoV corresponding to the camera 602*a* may change when the human enters the second FoV or the third FoV. Thus, the local ID for the second FOV and the third FOV may be different from the local ID of the first FoV. For example, when the human moves from the first FoV to the second FoV or the third FoV, the local ID may change.

It should be noted that video data, for example @30 fps, from the overhead cameras may be preprocessed and each frame is processed through the object detection and classification models for human detection (person and head detections). Further, detected bounding boxes corresponding to the person and head in a local view of each camera may be projected to a global view i.e., on a floor space using Homographic transformations. The projected view may be separated into three regions—an entrance region, a non-overlapping region (i.e., a non-OLR) and an overlapping region (i.e., an OLR, where two or more camera views intersect). The person and the head of the person along with key points may be detected at the entrance region, a unique global ID may be created and assigned to the human. There is also a local ID that is assigned to the human whenever detected in a FoV, using a deep sort algorithm (for example, the CV algorithm), which is persistent within the local view of each camera. At the entrance region in the FoV of the first camera, the key points may be generated for each human and stored in a data structure. Since the key points are more visible at the periphery of FoV for each camera, the key points along with speed and appearance of each human may be used to disambiguate tracking errors at the periphery of the FoV.

Figure 7:
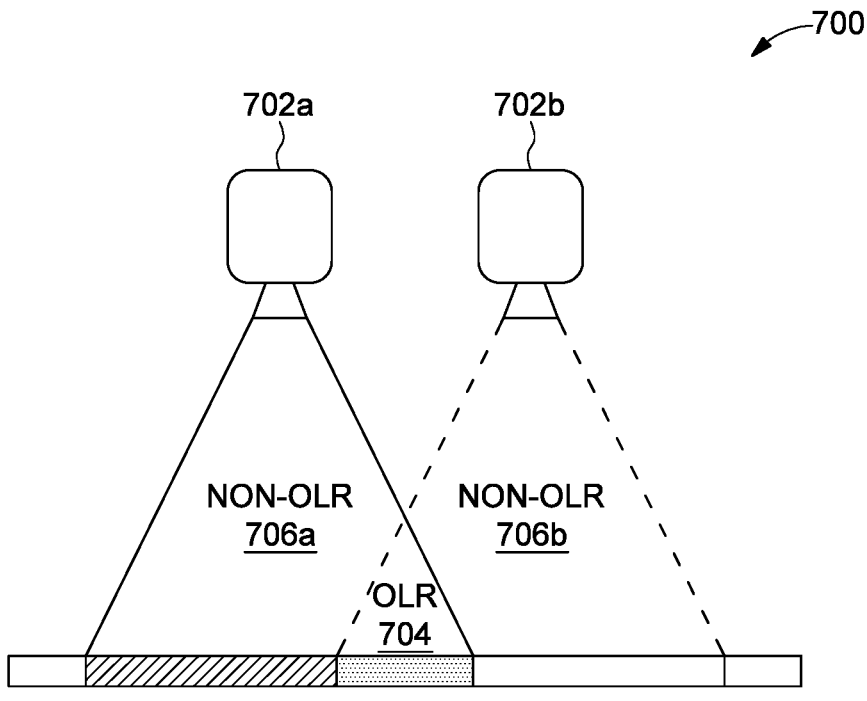
FIG. 7 illustrates another exemplary system representing Field of Views (FoVs) of two cameras, in accordance with some embodiments of the present disclosure.

FIG. 7 is another exemplary system 700 that depicts FoVs of two cameras in an area, in accordance with an exemplary embodiment of the present disclosure. FIG. 7 is explained in conjunction with FIGS. 1-6. The system 700 includes a camera 702*a*, and a camera 702*b*. Each of the cameras 702*a*, and 702*b* may be mounted vertically capturing a scenario of the area from top. The camera 702*a* may have a first FoV which includes an OLR 704, and a non-OLR 706*a*. The camera 702*b* may have a second FoV which includes the OLR 704, and a non-OLR 706*b*. As an OLR corresponds to a region of intersection between at least two FoVs, it may be noted that the OLR 704 is a region of intersection between the first FOV of the camera 702*a* and the second FOV of the camera 702*b*.

In the first and second FoVs, each human may be assigned the local ID of each camera and the global ID. Further, transition of a global ID of a human from one FoV to another FoV may be handled through a combination of Hungarian assignment, IOU based track detection, an appearance model, and velocity and direction estimation of a subsequent frame in the video data.

Figure 8:
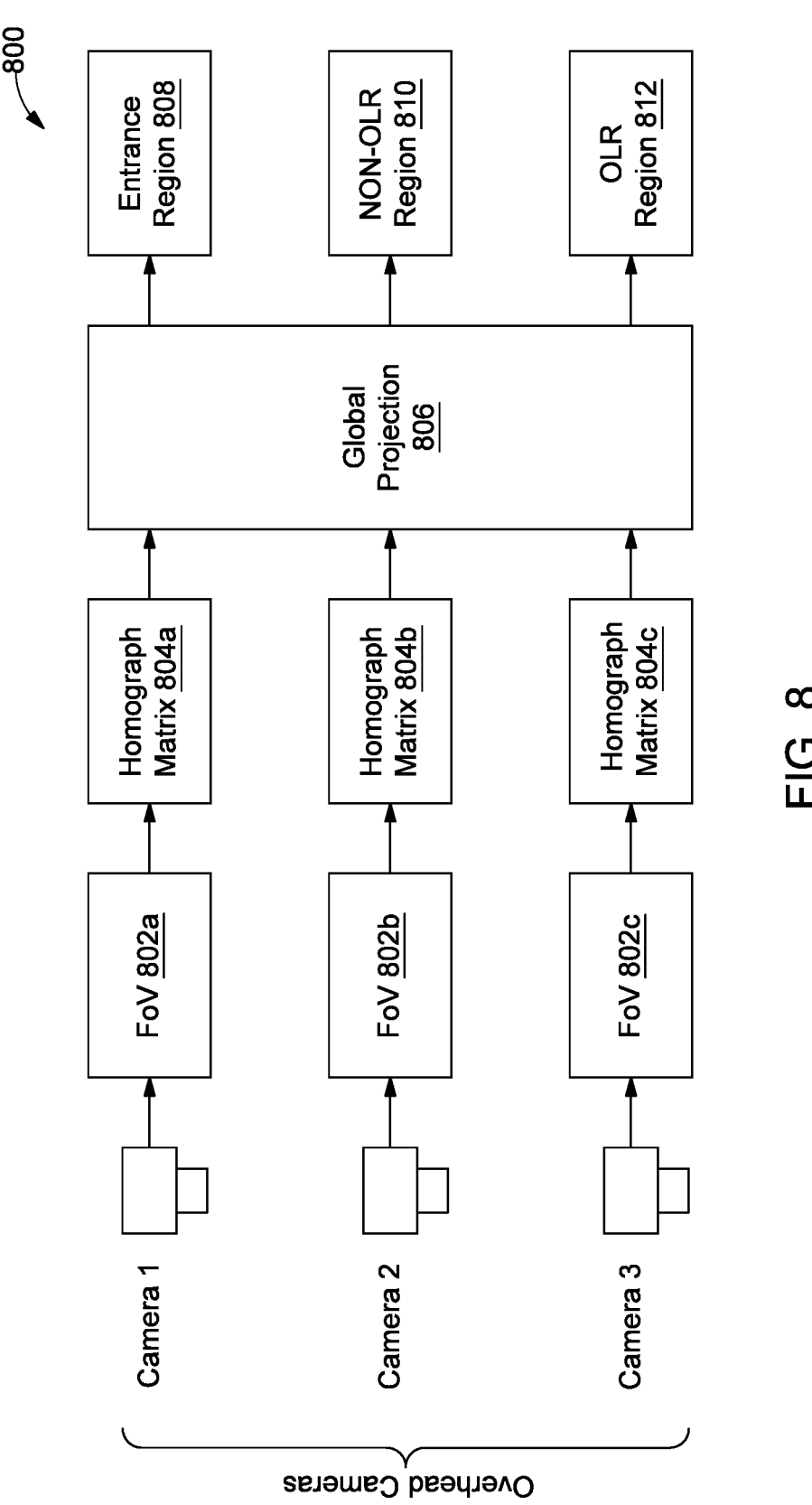
FIG. 8 illustrates a control logic for presenting different regions on a combined homograph matrix, in accordance with some embodiments of the present disclosure.

FIG. 8 depicts a control logic 800 for presenting different regions on a combined homograph matrix, in accordance with an exemplary embodiment of the present disclosure. FIG. 8 is explained in conjunction with FIGS. 1-7. The control logic 800 includes overhead cameras-a camera 1, a camera 2, and a camera 3-having corresponding FoVs, respectively-a FoV 802*a*, a FoV 802*b*, and a FoV 802*c*. The cameras 1, 2, and 3 may be mounted vertically in such a way that a view from each camera overlaps with an adjacent camera as illustrated in the FIG. 6. In a preferred embodiment, the FoVs may be rectangular in shape. Alternately, the FoVs may be of any other shape that may allow complete coverage of the area. A homograph matrix 804*a* may be generated corresponding to the FoV 802*a*. A homograph matrix 804*b* and a homograph matrix 804*c* may be generated corresponding to the FoV 802*b* and the FoV 802*c*, respectively. These homograph matrices 804*a*, 804*b*, 804*c* may be combined to obtain a combined homograph matrix. The homograph matrices 804*a*, 804*b*, and 804*c* may be used to project the FoVs 802*a*, 802*b*, and 802*c* in a global view. In particular, the detected bounding boxes corresponding to the person and head in a local view of each camera may be projected to a global view i.e., on a floor space using Homographic matrices 804a, 804b, and 804c. The projected view may be separated into three regions—an entrance region 808, a non-OLR 810, and an OLR 812, where two or more camera views intersect. In other words, a global projection 806 of the entrance region 808, the non-OLR 810, and the OLR 812 on the combined homograph matrix may be performed to present the entrance region 808, the non-OLR 810, and the OLR 812 on the combined homograph matrix.

Figure 9:
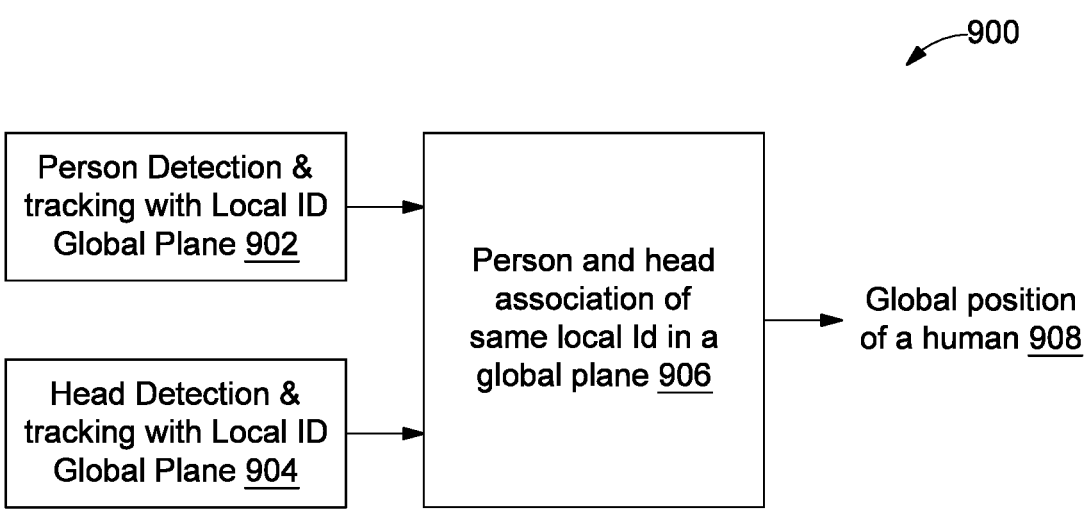
FIG. 9 illustrates a control logic for determining global positions of humans, in accordance with some embodiments of the present disclosure.

FIG. 9 depicts a control logic 900 for determining global positions of humans, in accordance with an exemplary embodiment of the present disclosure. FIG. 9 is explained in conjunction with FIGS. 1-8. At step 902, a person corresponding to a human may be detected through a local ID assigned to the person in a global plane. At step 904, a head corresponding to the human may be detected through the local ID assigned to the head in the global plane. It should be noted that local IDs may be assigned to the humans when detected in a FoV. Both the head and the person detection are performed using object detection and classification models. Further, at step 906, the person may be associated with the head in the global plane to determine a global position of the human 908. The head detection and the person detection may be associated through geometric computations. The head (corresponding to the human) may be correctly associated with the person (corresponding to the human) when a centroid of a head bounding box is within a person bounding box on the combined homograph matrix. Locations of the head detection and the person detection may be captured for each frame and saved in a local data structure and a global data structure for spatial and temporal references.

The data related to the head bounding box may be added to the local data structure and the global data structure for spatial and temporal references and is used while resolving ambiguities when multiple people are within the proximity, during partial or complete occlusion, and/or loss in local track ID. The algorithm also detects and resolves ambiguities when a number of heads and persons detections differ in a frame by referring to the spatial and temporal information of each object stored in the local data structure and the global data structure. This issue may occur if there is an issue in performance of a detection algorithm (such as a CV algorithm). In situations where two local IDs are very close to each other, the resource assignment algorithm, along with a head detection algorithm, disambiguates the situation in which the one of the IDs loses its local ID. Where a local tracker for a given camera FoV faces a challenge of tracking overlapping bounding boxes resulting from people standing or moving close to one another, detection of individual heads and association of the heads with bounding boxes that they are embedded into is used as a means of disambiguation. The appearance-based model, by identifying key points, plays a major role in resolving the ambiguity in identifying the right person along with the others when the persons are in the periphery of the FoV for the given camera. In addition to the appearance-based model, motion model, and resource assignment algorithm are used to resolve ambiguities and maintain the continuity of the global ID of the detected humans.

If local tracks are momentarily broken and are not detected due to streaming issue, and/or partial or complete occlusion, or local tracking algorithm failure, new local IDs for the given local IDs (i.e., lost local IDs) are correctly mapped using head detection algorithm. In case global identity tracking finds a local ID track broken, the broken track is recovered by associating it with unattached bounding boxes detected in the local camera FoV using the resource assignment algorithm based on position, appearance, and motion vector of the broken local ID track. The attributes in the local data structure and the global data structure helps in re-identification of the persons once local tracking re-instantiates.

Figure 10:
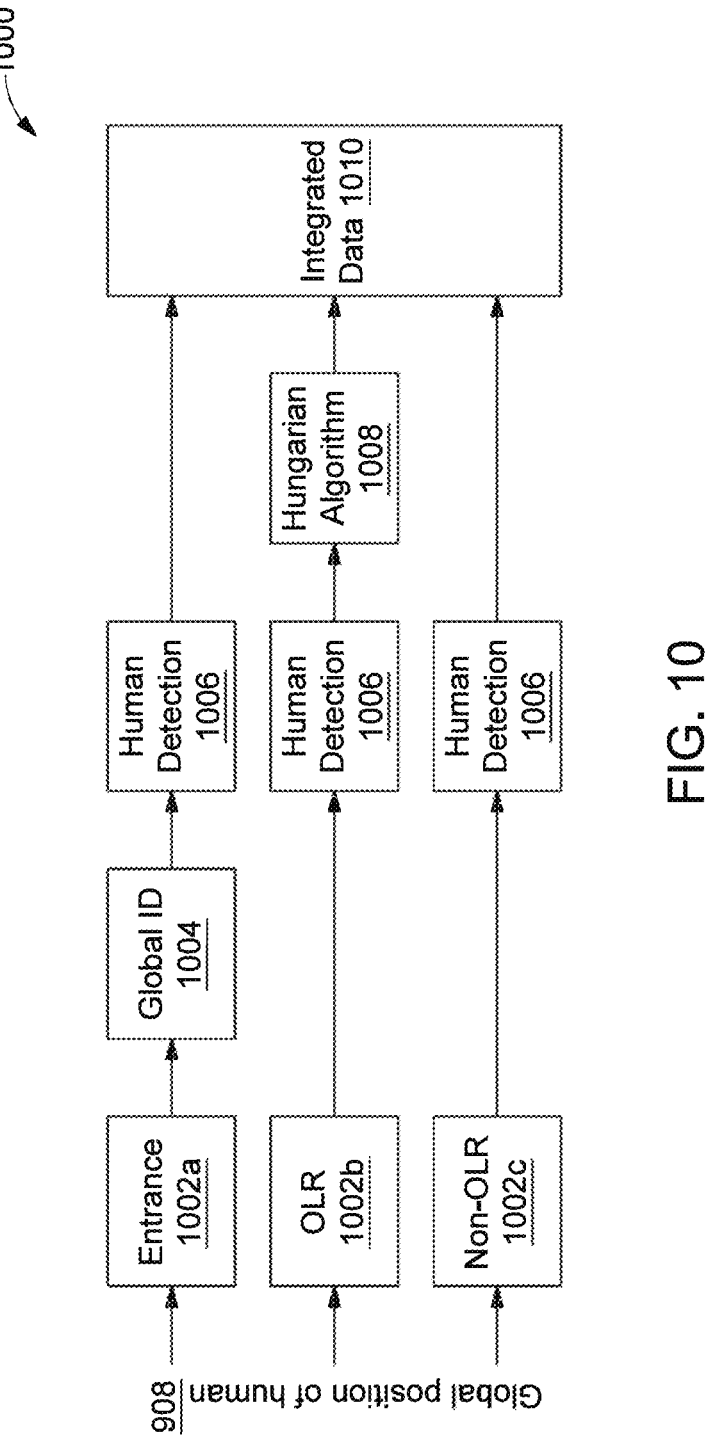
FIG. 10 illustrates a control logic for continuously tracking humans, in accordance with some embodiments of the present disclosure.

FIG. 10 depicts a control logic 1000 for continuously tracking humans, in accordance with an exemplary embodiment of the present disclosure. FIG. 10 is explained in conjunction with FIGS. 1-9. Presentation of an entrance region 1002a (for example, the entrance region 808), an OLR 1002b (for example, the OLR 810), and a non-OLR 1002c (for example, the non-OLR 812) on the combined homograph matrix, and determination of the global positions of the humans (for example, a global position of the human 908) has been already explained in FIGS. 8-9. Further, whenever a position of the human is detected at the entrance region 1002a, a global ID 1004 may be assigned to the human. Further, human detection 1006 may be performed. Presence of the humans may be detected through object detection and classification models. Thus, the human detection 1006 may be performed at each of the entrance region 1002a, the OLR 1002b, and the non-OLR 1002c whenever one or more humans enter such regions. Further, when the human is detected on the OLR 1002b, a corresponding global ID may be reassigned to the human. For reassigning global IDs to humans at the OLR 1002b, a Hungarian algorithm 1008 may be used along with IOU based track detection model, an appearance model, and velocity and direction estimation model. Further, integrated data 1010 may be generated based on this whole process which may be stored in a database for further use. The integrated data 1010 may include attributes of the humans. The attributes may include spatial attributes and temporal attributes which may be used further to resolve ambiguities when occur.

Figure 11A:
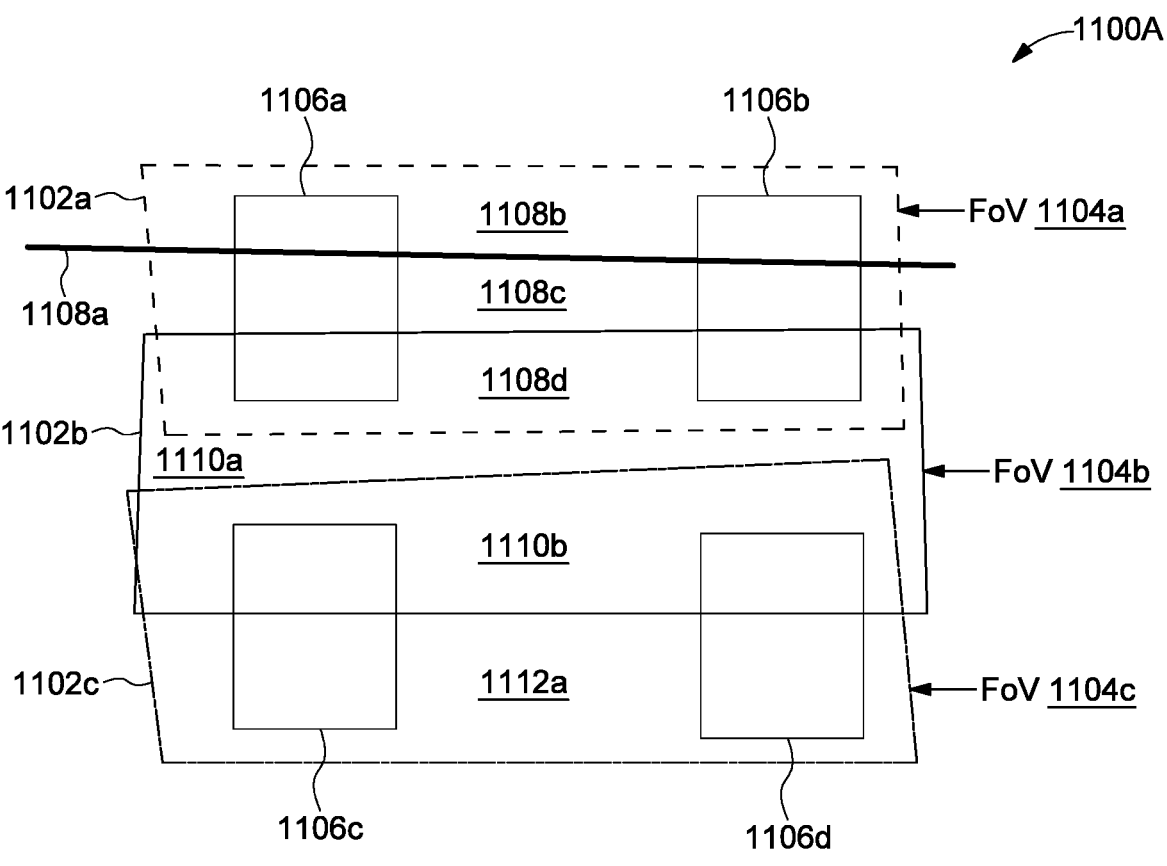
FIG. 11A illustrates an exemplary global view created for three cameras using a homographic matrix for each camera, in accordance with some embodiments of the present disclosure.

FIG. 11A is an exemplary global view 1100A created for three cameras using a homographic matrix for each camera, in accordance with an exemplary embodiment of the present disclosure. The global view 1100A may correspond to a combined homograph matrix. FIG. 11A is explained in conjunction with FIGS. 1-10. The global view 1100A may include a homograph matrix 1102a corresponding to a FoV 1104a of the camera 602a, a homograph matrix 1102b corresponding to a FoV 1104b of the camera 602b, and a homograph matrix 1102c corresponding to a FoV 1104c of the camera 602c. Thus, overall, the combined homograph matrix is represented in the global view 1100A. Further, the global view 1100A includes four shelves 1106a, 1106b, 1106c, and 1106d, which may be present in an area where the cameras may be present. The homograph matrix 1102a may include a predetermined entrance 1108a, a gid creation region 1108b, a non-OLR 1108c, and an OLR 1108d. The predetermined entrance 1108a may be considered for assigning global IDs to humans. The homograph matrix 1102b may include a non-OLR 1110a, an OLR 1110b, and the OLR 1108d. The homograph matrix 1102c may include the OLR 1110b, and a non-OLR 1112a. It may be noted that the OLR 1108d is a region of intersection between the FoVs 1104a and 1104b, and the OLR 1110b is a region of intersection between the FoVs 1104b and 1104c.

Figure 11B:
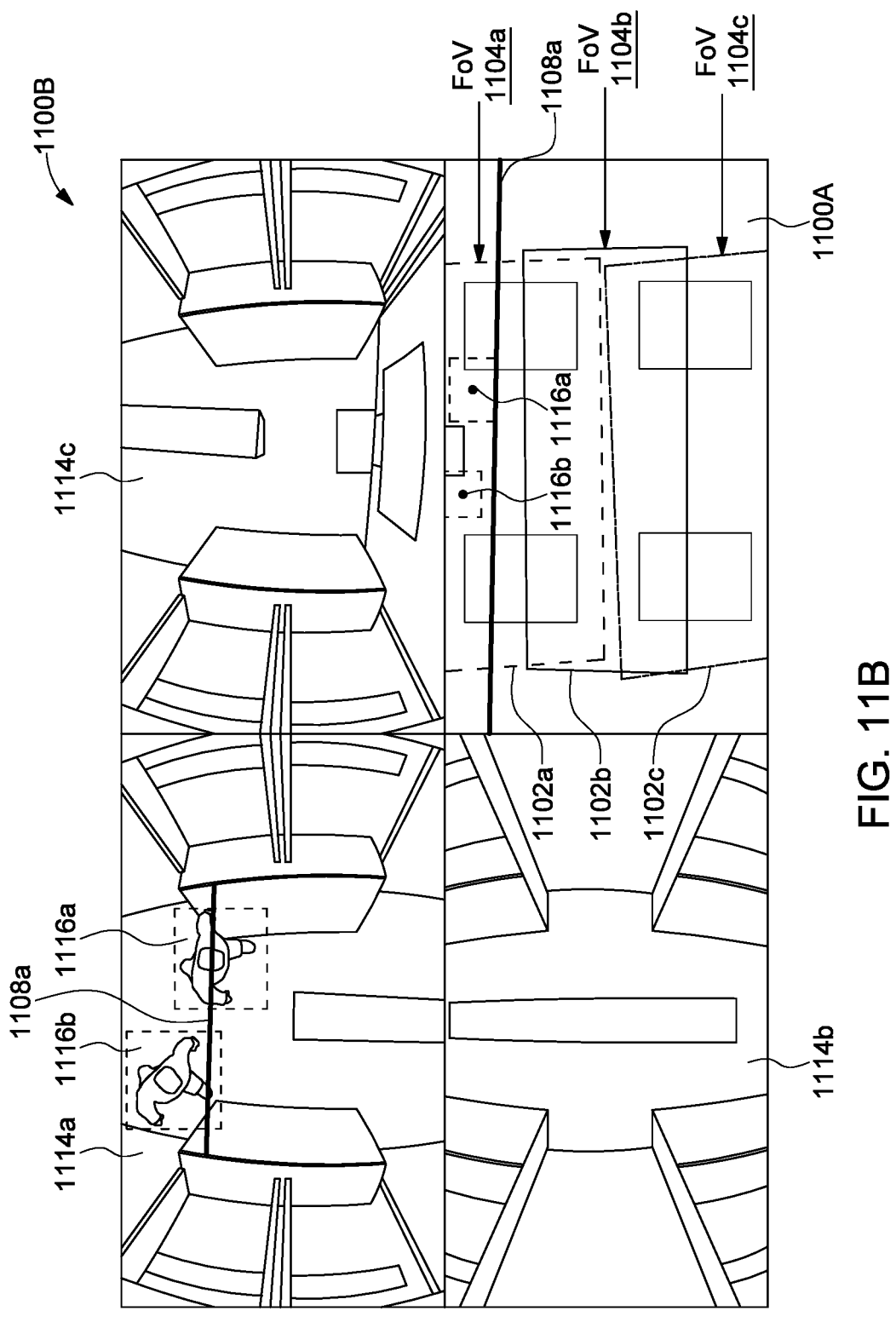
FIG. 11B illustrates an exemplary scenario of assigning global IDs upon detecting humans at entrance region for a first time, in accordance with some embodiments of the present disclosure.

FIG. 11B is an exemplary scenario 1100B that illustrates assignment of global IDs upon detecting humans at entrance region for a first time, in accordance with an exemplary embodiment of the present disclosure. FIG. 11B is explained in conjunction with FIGS. 1-11A. The exemplary scenario 1100B includes three FoVs—an FoV 1114a, an FoV 1114b, and an FoV 1114c corresponding to the cameras 602a, 602b, and 602*c*, respectively. Further, the exemplary scenario 1100B includes the global view 1100A created for the FoVs 1114*a*, 1114*b*, and 1114*c* using homographic matrices for the cameras 602*a*, 602*b*, and 602*c*. It should be noted that the FoV 1114*a* corresponds to the FoV 1104*a*, the FoV 1114*b* corresponds to the FoV 1104*b*, and 1114*c* corresponds to the FoV 1104*c*. As illustrated in the FoV 1114*a*, two humans 1116*a* and 1116*b* may be detected at the entrance region for the first time. The human 1116*a* may be assigned with a global ID 'P2' and the human 1116*b* may be assigned with the global ID 'P3' at the predetermined entrance 1108*a* or before crossing the entrance 1108*a*. It should be noted that a head and a person corresponding to a humans may be detected along with the key points, for each of the two humans 1116*a* and 1116*b*. The head may be associated with a right person by applying geometrical computations. This data may be constructed and stored in a global data structure. Further, there is no human detected in the FoVs 1114*b* and 1114*c*. Similarly, in the global view 1100A, the detected humans may be presented on the combined homograph matrix at the entrance region.

Figure 11C:
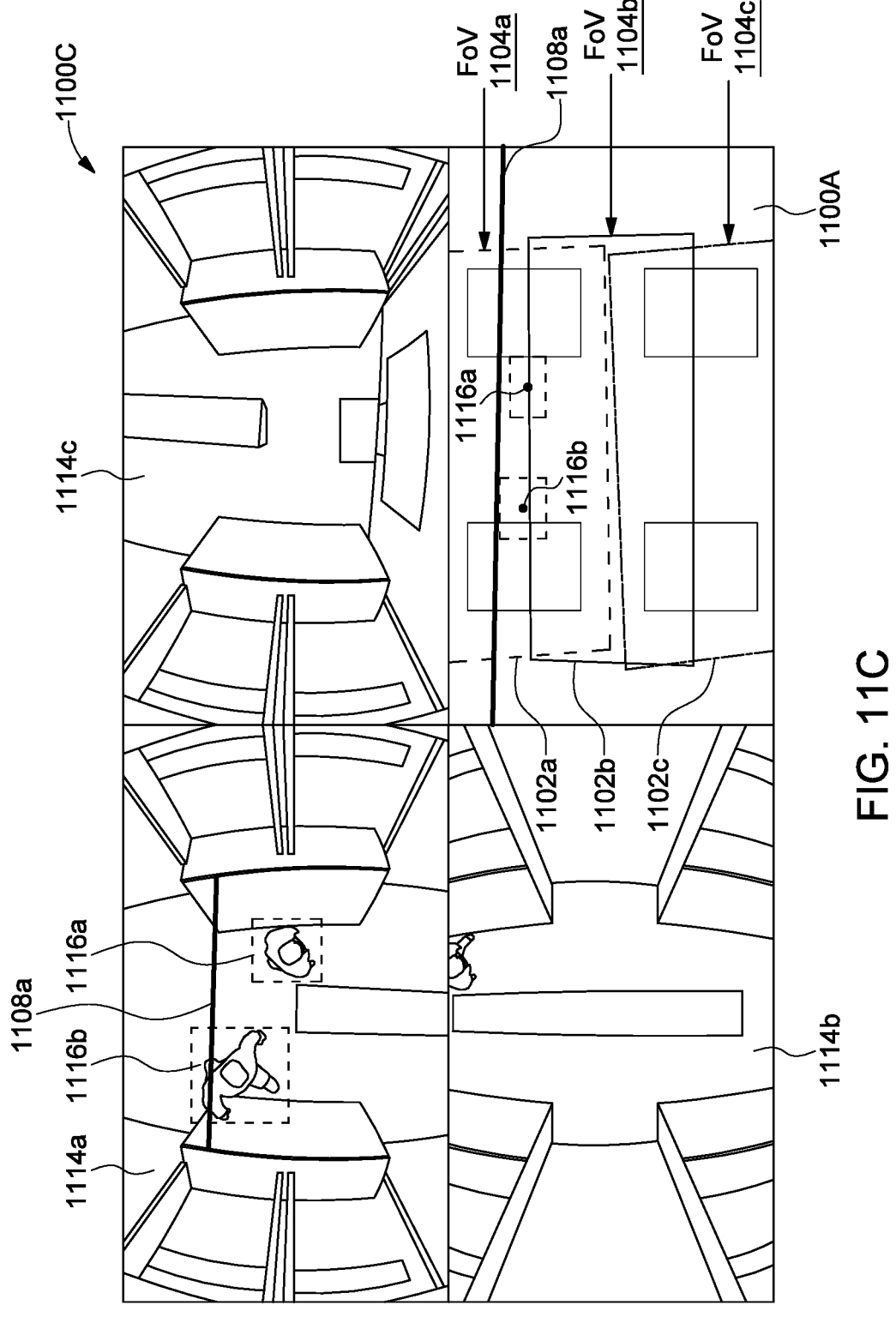
FIG. 11C illustrates an exemplary scenario of person association in a non-overlapping region, in accordance with some embodiments of the present disclosure.

FIG. 11C is an exemplary scenario 1100C that illustrates person association in a non-overlapping region, in accordance with an exemplary embodiment of the present disclosure. FIG. 11C is explained in conjunction with FIGS. 1-11B. As illustrated in the scenario 1100C, in a non-overlapping region of the FoV 1114*a*, the humans 1116*a* and 1116*b* have crossed the predetermined entrance 1108*a*. The human 1116*a* and 1116*b* are presented in the non-OLR 1108*c* on the combined homograph matrix, in the global view 1100A. Further, the human 1116*a* may be moving from the FoV 1114*a* to the FoV 1114*b*. Thus, only body of the human 1114*a* is detected in the FoV 1114*b*, however, a head of the human 1114*a* does not appear in the FoV 1114*b*. As a result, the human 1116*a* is not presented in the OLR 1108*d* and presented only in the non-OLR 1108*c*, on the combined homograph matrix, in the global view 1100A.

IOU based logic with a threshold of 70%, probabilistic estimate of velocity and direction of each object, an appearance model, and validation of the key points of each person from the data structure are applied with weightage given to each of these algorithms and are used to assign and track the global ID with the FoV 1114*a* of the camera 602*a*.

Figure 11D:
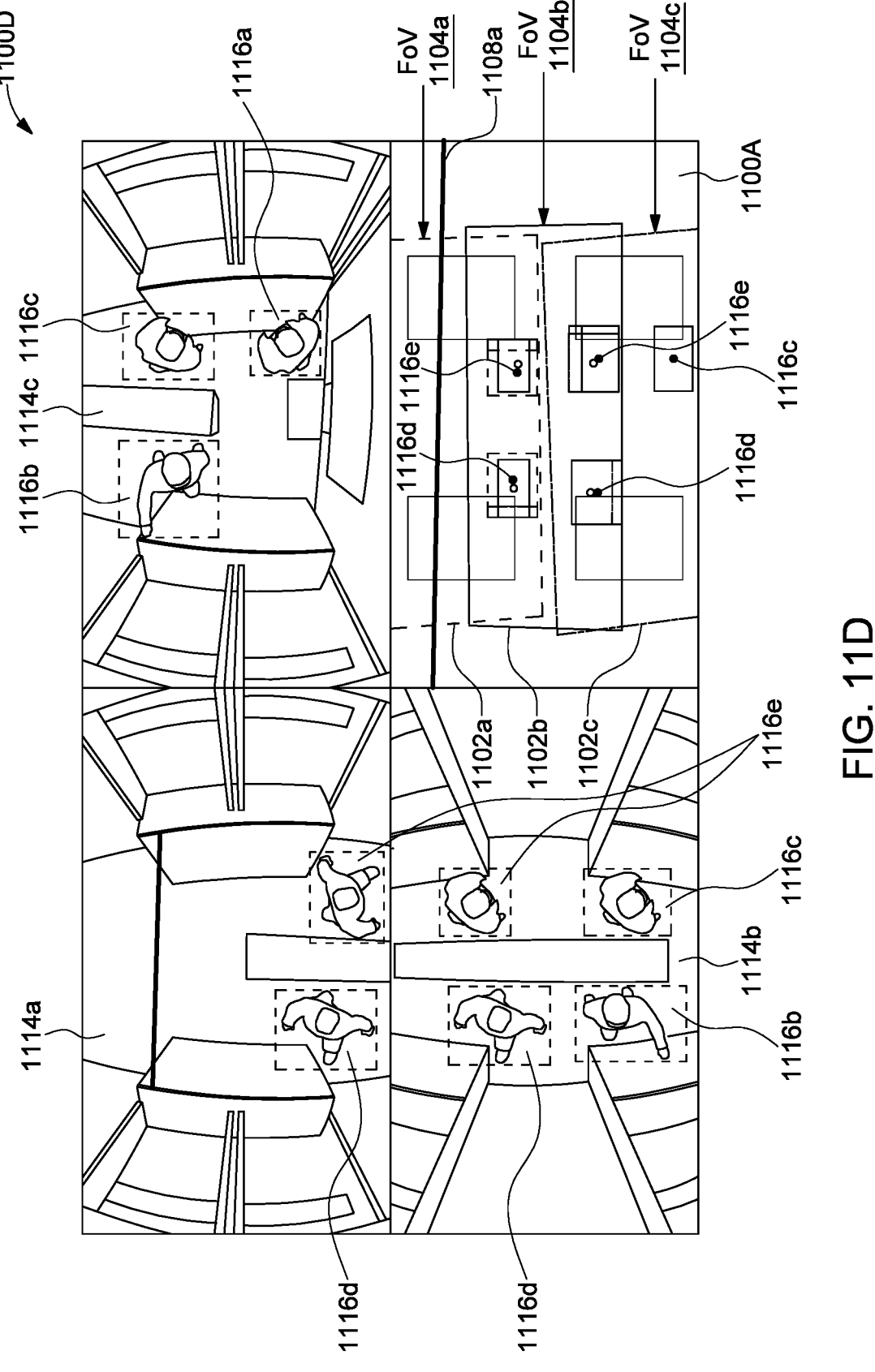
FIG. 11D illustrates an exemplary scenario of person association in an overlapping region, in accordance with some embodiments of the present disclosure.

FIG. 11D is an exemplary scenario 1100D that illustrates person association in an overlapping region, in accordance with an exemplary embodiment of the present disclosure. FIG. 11D is explained in conjunction with FIGS. 1-11C. As illustrated in the exemplary scenario 1100D humans 1116*c*, 1116*d*, 1116*e* with global IDs 'P4', 'P5', and 'P6', respectively, may have entered the area. The humans 1116*d* and 1116*e* may be moved from the FoV 1114*a* to 1114*b*, as they are detected in both the FoVs 1114*a* and 1114*b*. Thus, 1116*d* and 1116*e* are presented in the OLR 1108*d* on the combined homograph matrix, in the global view 1100A. It should be noted that the global IDs 'P5' and 'P6' corresponding to the humans 1116*d* and 1116*e* remain same in the FoVs 1114*a* and 1114*b*, as the global ID 'P5' and 'P6' may be reassigned to the humans 1116*d* and 1116*e*, respectively, when their FoVs are changed. However, their local IDs may have changed with the change in FoVs. Further, the humans 1116*b* and 1116*c* may be moved from the FoV 1114*b* to 1114*c*, as they are detected in the FoVs 1114*b* and 1114*c*. Thus, the humans 1116*b* and 1116*c* are presented in the OLR 1110*b* in the global view 1100A. It should be noted that the global IDs 'P3' and 'P4' corresponding to the humans 1116*b* and 1116*c* remain same in the FoVs 1114*b* and 1114*c*, as the global ID 'P3' and 'P4' may be reassigned to the humans 1116*b* and 1116*c*, respectively, when their FoVs are changed. However, their local IDs may have changed with the change in FoVs. Further, the human 1116*a* is detected only in the FoV 1114*c*. Thus, the human 1116*a* is presented in the non-OLR 1112*a* in the global view 1100A.

IOU based logic with a threshold of 70%, probabilistic estimate of velocity and direction of each object, Hungarian assignment for optimizing the assignment of global ID are applied with weightage given to each of these algorithms to transition the global ID from the FoV of one camera to the FoV of the other camera using a handover mechanism. The handover mechanism may include location mapping of the OLR 1110*b* of adjacent FoVs so that bounding boxes of the adjacent FoVs can be located using a common set of coordinates. The mapping may be achieved through geometric alignment or homographic transformation (possibly calibrated if required using landmarks). Further, if the bounding boxes of the two camera views have an IOU (intersection over union-quantifying overlap) beyond a threshold, the handover mechanism may include associating the bounding boxes with the same global ID as associated with the bounding box of the FoV the person is leaving. Further, if bounding boxes in the OLR 1110*b* of adjacent FoVs do not have adequate IOU, a resource allocation algorithm (such as the Hungarian assignment algorithm) based on position, appearance, and motion vectors is used to associate the bounding boxes from the two FoVs.

For each human of the one or more humans, the unique global ID may be reassigned to the human when the human moves from the first FoV to the second FoV through an overlapping region between the first FoV and the second FoV using IOU of bounding boxes or masks computed through mapping of the overlapping FoV to a common frame of reference (typically the second camera's FoV coordinates) as well as the resource assignment algorithm based on the appearance and motion vectors of the respective bounding boxes.

Figure 12:
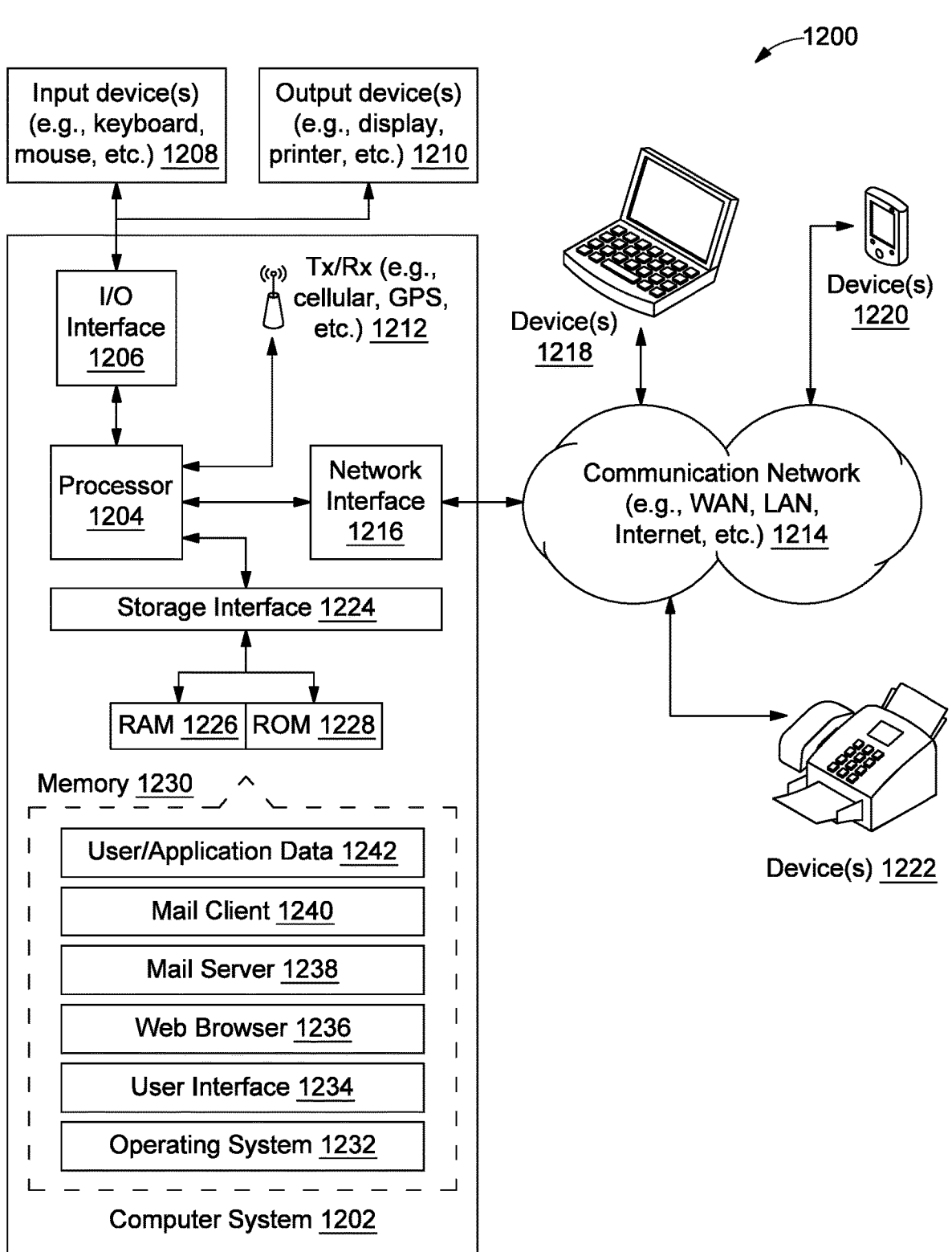
FIG. 12 illustrates a block diagram of an exemplary computer system for implementing embodiments consistent with the present disclosure.

The disclosed methods and systems may be implemented on a conventional or a general-purpose computer system, such as a personal computer (PC) or server computer. FIG. 12 is a block diagram that illustrates a system architecture 1200 of a computer system 1202 for determination of personality traits of agents in a contact center, in accordance with an exemplary embodiment of the present disclosure. Variations of computer system 1202 may be used for implementing server 101 for determination of personality traits of agents in a contact center. Computer system 1202 may include a central processing unit ("CPU" or "processor") 1204. Processor 1204 may include at least one data processor for executing program components for executing user-generated or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD® ATHLON®, DURON® OR OPTERON®, ARM's application, embedded or secure processors, IBM® POWERPC®, INTEL® CORE® processor, ITANIUM® processor, XEON® processor, CELERON® processor or other line of processors, etc. The processor 1204 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 1204 may be disposed in communication with one or more input/output (I/O) devices via I/O interface 1206. The I/O interface 1206 may employ communication protocols/methods such as, without limitation, audio, analog, digital, monoaural, RCA, stereo, IEEE-1394, near field communication (NFC), FireWire, Camera Link®, GigE, serial bus, universal serial bus (USB), infrared, PS/2, BNC, coaxial, component, composite, digital visual interface (DVI), high-definition multimedia interface (HDMI), radio frequency (RF) antennas, S-Video, video graphics array (VGA), IEEE 802.n/b/g/n/x, Bluetooth, cellular (e.g., code-division multiple access (CDMA), high-speed packet access (HSPA+), global system for mobile communications (GSM), long-term evolution (LTE), WiMAX, or the like), etc.

Using the I/O interface 1206, the computer system 1202 may communicate with one or more I/O devices. For example, the input device 1208 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, altimeter, gyroscope, proximity sensor, or the like), stylus, scanner, storage device, transceiver, video device/source, visors, etc. Output device 1210 may be a printer, fax machine, video display (e.g., cathode ray tube (CRT), liquid crystal display (LCD), light-emitting diode (LED), plasma, or the like), audio speaker, etc. In some embodiments, a transceiver 1212 may be disposed in connection with the processor 1204. The transceiver 1212 may facilitate various types of wireless transmission or reception. For example, the transceiver 1212 may include an antenna operatively connected to a transceiver chip (e.g., TEXAS INSTRUMENTS® WILINK WL1286®, BROADCOM® BCM4550IUB8®, INFINEON TECHNOLOGIES® X-GOLD 1436-PMB9800® transceiver, or the like), providing IEEE 802.11a/b/g/n, Bluetooth, FM, global positioning system (GPS), 2G/3G HSDPA/HSUPA communications, etc.

In some embodiments, the processor 1204 may be disposed in communication with a communication network 1214 via a network interface 1216. The network interface 1216 may communicate with the communication network 1214. The network interface 1216 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 1214 may include, without limitation, a direct interconnection, local area network (LAN), wide area network (WAN), wireless network (e.g., using Wireless Application Protocol), the Internet, etc. Using the network interface 1216 and the communication network 1214, the computer system 1202 may communicate with devices 1218, 1220, and 1222. These devices may include, without limitation, personal computer(s), server(s), fax machines, printers, scanners, various mobile devices such as cellular telephones, smartphones (e.g., APPLE® IPHONE®, BLACKBERRY® smartphone, ANDROID® based phones, etc.), tablet computers, eBook readers (AMAZON® KINDLER, NOOK® etc.), laptop computers, notebooks, gaming consoles (MICROSOFT® XBOX®, NINTENDO® DS®, SONY® PLAYSTATION®, etc.), or the like. In some embodiments, the computer system 1202 may itself embody one or more of these devices.

In some embodiments, the processor 1204 may be disposed in communication with one or more memory devices 1230 (e.g., RAM 1226, ROM 1228, etc.) via a storage interface 1224. The storage interface 1224 may connect to memory devices 1230 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), STD Bus, RS-232, RS-422, RS-485, I2C, SPI, Microwire, 1-Wire, IEEE 1284, Intel® QuickPathInterconnect, InfiniBand, PCIe, etc. The memory drives may further include a drum, magnetic disc drive, magneto-optical drive, optical drive, redundant array of independent discs (RAID), solid-state memory devices, solid-state drives, etc.

The memory devices 1230 may store a collection of program or database components, including, without limitation, an operating system 1232, user interface 1234, web browser 1236, mail server 1238, mail client 1240, user/application data 1242 (e.g., any data variables or data records discussed in this disclosure), etc. The operating system 1232 may facilitate resource management and operation of the computer system 1202. Examples of operating systems include, without limitation, APPLE® MACINTOSH® OS X, UNIX, Unix-like system distributions (e.g., Berkeley Software Distribution (BSD), FreeBSD, NetBSD, OpenBSD, etc.), Linux distributions (e.g., RED HAT®, UBUNTU®, KUBUNTU®, etc.), IBM® OS/2, MICROSOFT® WINDOWS® (XP®, Vista®/7/8/10/11, etc.), APPLE® IOS®, GOOGLE® ANDROID®, BLACKBERRY® OS, or the like. User interface 1234 may facilitate display, execution, interaction, manipulation, or operation of program components through textual or graphical facilities. For example, user interfaces may provide computer interaction interface elements on a display system operatively connected to the computer system 1202, such as cursors, icons, check boxes, menus, scrollers, windows, widgets, etc. Graphical user interfaces (GUIs) may be employed, including, without limitation, APPLE® MACINTOSH® operating systems' AQUA® platform, IBM® OS/2®, MICROSOFT® WINDOWS® (e.g., AERO®, METRO®, etc.), UNIX X-WINDOWS, web interface libraries (e.g., ACTIVEX®, JAVAR, JAVASCRIPT®, AJAX®, HTML, ADOBE® FLASH®, etc.), or the like.

In some embodiments, the computer system 1202 may implement a web browser 1236 stored program component. The web browser 1236 may be a hypertext viewing application, such as MICROSOFT® INTERNET EXPLORER®, GOOGLE® CHROME®, MOZILLA® FIREFOX®, APPLE® SAFARI®, etc. Secure web browsing may be provided using HTTPS (secure hypertext transport protocol), secure sockets layer (SSL), Transport Layer Security (TLS), etc. Web browsers may utilize facilities such as AJAX®, DHTML, ADOBE® FLASH®, JAVASCRIPT®, JAVAR, application programming interfaces (APIs), etc. In some embodiments, the computer system 1202 may implement a mail server 1238 stored program component. The mail server 1238 may be an Internet mail server such as MICROSOFT® EXCHANGE®, or the like. The mail server 1238 may utilize facilities such as ASP, ActiveX, ANSI C++/C#, MICROSOFT .NET® CGI scripts, JAVAR, JAVASCRIPT®, PERL®, PHP®, PYTHON®, WebObjects, etc. The mail server 1238 may utilize communication protocols such as internet message access protocol (IMAP), messaging application programming interface (MAPI), MICROSOFT® EXCHANGE®, post office protocol (POP), simple mail transfer protocol (SMTP), or the like. In some embodiments, the computer system 1202 may implement a mail client 1240 stored program component. The mail client 1240 may be a mail viewing application, such as APPLE MAIL®, MICROSOFT ENTOURAGE®, MICROSOFT OUTLOOK®, MOZILLA THUNDERBIRD®, etc.

In some embodiments, computer system 1202 may store user/application data 1242, such as the data, variables, records, etc. (e.g., the set of predictive models, the plurality of clusters, set of parameters (batch size, number of epochs, learning rate, momentum, etc.), accuracy scores, competitiveness scores, ranks, associated categories, rewards, threshold scores, threshold time, and so forth) as described in this disclosure. Such databases may be implemented as fault-tolerant, relational, scalable, secure databases such as ORACLE® OR SYBASE® OR POSTGRESQL® OR any such similar data. Alternatively, such databases may be implemented using standardized data structures, such as an array, hash, linked list, struct, structured text file (e.g., XML), table, or as object-oriented databases (e.g., using OBJECTSTORE®, POET®, ZOPE®, etc.). Such databases may be consolidated or distributed, sometimes among the various computer systems discussed above in this disclosure. It is to be understood that the structure and operation of the any computer or database component may be combined, consolidated, or distributed in any working combination.

Thus, the present disclosure may overcome drawbacks of traditional systems as discussed before. The present disclosure establishes and maintains error-free continuous identity of humans moving over a floor space through a combination of tessellated overhead camera configuration covering the entire floor space where camera views overlap at the edges, mapping of each local camera view onto a global camera view may be performed, mapping of each human in any given local camera view to a global identity, with seamless transition across multiple camera views, disambiguation of global identity tracking and ensure continuity of global tracking ID even under circumstances where local IDs are interchanged or lost on account of errors in the single-view based human tracking mechanism. The disclosure provides a method of mapping each human in any given local camera view to a global identity, with seamless transition across multiple camera views, achieved through a combination of a Homographic transformation of bounding boxes corresponding to humans identified in local camera views, an identity handover mechanism at overlapping regions of camera views, and an identity allocation algorithm that performs bounding box mapping based on resource allocation constraints (e.g. a Hungarian algorithm) using IOU criterion, motion, and appearance model of globally mapped bounding boxes.

The disclosure provides a unique combination of identity disambiguating algorithms covering a variety of corner cases to ensure error-free global identity tracking for humans on the floor space. Various ambiguous situations (each situation is addressed by a dedicated mitigation mechanism) may be handled by the algorithm. For example, ambiguities may arise when tracking is abruptly lost in a local camera view, when two humans come so close together that significant portions of their bounding boxes overlap in the local camera view, from the mapping of local view bounding boxes onto the global floor space, when more than one human is present in the overlapping region between camera views, and from partial body visibility creating erroneous or missing bounding boxes.

This disclosure helps in tracking people on a large floor space spanned by multiple video cameras and ensuring the continuity of their identity from the point of entrance to the point of exit if they are visible in the camera's FoV. The FoVs of the cameras are arranged so that they overlap with each other to transition the identity of person or objects from one camera view to the other.

The disclosure provides a practical solution for tracking multiple humans across multiple camera views by associating a unique ID to each of the humans and identifying the humans without losing their identity across all other camera views. There are wide range of application areas for tracking humans. For example, in retail stores, human tracking generates actionable insights by tracking customer behaviors in the stores. Further, in autonomous stores, identifying and tracking each human independently and accurately with very high accuracy is possible with the help of the present disclosure, thereby helping to overcome a problem of shopping cart mismatch issues and billing issues. It is also applicable in retail stores to perform queue monitoring and serve the customers efficiently.

The disclosure may be applicable in surveillance, where human behavior understanding is done by human detection, classification and tracking using video surveillance cameras. Intrusion detection and tracking is a popular feature under AI vision surveillance. The disclosure may be used in civil works for tracking the construction workers with the safety equipment and safety paths continuously, and to generate alerts in case of trespassing into restricted sites. The disclosure may be helpful in counting the humans to estimate and understand the capacity. The disclosure is explained for human tracking and further it can be extended to multi object tracking as well.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or process steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

We claim:

1. A method for continuously tracking humans in an area, the method comprising:

receiving, by a computing device, video data of the area from a plurality of overhead cameras, wherein the plurality of overhead cameras comprises a first overhead camera and a second overhead camera, the first overhead camera comprises a first Field of View (FoV) and the second overhead camera comprises a second FoV;

detecting, by the computing device, presence of one or more humans in the first FoV through object detection and classification models;

assigning, by the computing device, a unique global identity (ID) for each of the one or more humans in the first FOV; and reassigning, by the computing device, the unique global ID for each of the one or more humans when each of the one or more humans moves from the first FoV to the second FoV through an overlapping region between the first FoV and the second FoV, using a weighted combination of a resource assignment algorithm, an intersection-over-union (IOU) based track detection, an appearance-based model, and velocity and direction estimation of a subsequent frame of the video data, wherein the overlapping region corresponds to a region of intersection between the first FoV and the second FoV; and continuously tracking, in real-time, by the computing device, each of the one or more humans in the area through the unique global ID.

2. The method of claim 1, further comprising:

generating, by the computing device, a plurality of homograph matrices corresponding to the first overhead camera and the second overhead camera, wherein each of the plurality of homograph matrices comprises a representation of the first FoV and the second FoV;

combining, by the computing device, the plurality of homograph matrices to obtain a combined homograph matrix; and presenting, in real-time, by the computing device, each of the detected one or more humans on the combined homograph matrix using homographic transformation.

3. The method of claim 2, wherein detecting the presence of one or more humans comprises:

identifying, by the computing device, a head of each of the one or more humans and an associated head bounding box using the object detection and classification models, wherein the head bounding box is presented on the combined homograph matrix;

identifying, by the computing device, a person corresponding to each of the one or more humans and an associated person bounding box using the object detection and classification models, wherein the person bounding box is presented on the combined homograph matrix; and associating, by the computing device, the head with the person when a centroid of the head bounding box is within the person bounding box on the combined homograph matrix, wherein each of the head bounding box and the person bounding box is dynamically adjustable based on motion of an associated human of the one or more humans.

4. The method of claim 1, further comprising identifying, by the computing device, a set of key points corresponding to each of the one or more humans using the appearance-based model.

5. The method of claim 1, further comprising:

assigning, by the computing device, a local ID to each of the detected one or more humans in the first FoV and the second FoV using a Computer Vision (CV) algorithm, wherein the local ID in the first FoV is different from the local ID in the second FoV for each of the detected one or more humans.

6. The method of claim 5, further comprising storing, by the computing device, attributes of each of the one or more humans, wherein the attributes comprise spatial attributes and temporal attributes.

7. The method of claim 6, further comprising:

identifying, by the computing device, an ambiguity while continuously tracking each human of the one or more humans, wherein the ambiguity corresponds to one of:

the human within a proximity threshold with another of the one or more humans, or loss of the local ID of the human due to an error or failure of the CV algorithm; and resolving, by the computing device, the ambiguity using the stored attributes.

8. The method of claim 7, wherein, when the ambiguity corresponds to the loss of the local ID of the human, the resolving comprises:

assigning a new local ID to the human; and reassigning the unique global ID corresponding to the human using the stored attributes.

9. The method of claim 1, wherein each of the plurality of overhead cameras is mounted vertically.

10. The method of claim 1, wherein continuously tracking in real-time, each of the one or more humans in the area further comprises:

tracking, by the computing device, each of the one or more humans based on the unique global ID when each of the one or more humans is in a non-overlapping region, using a combination of the IOU based track detection, the appearance-based model, and the velocity and direction estimation of a subsequent frame of the video data; and reassigning, by the computing device, the unique global ID for each of the one or more humans when each of the one or more humans moves through the overlapping region, using the weighted combination of the resource assignment algorithm, the IOU based track detection, the appearance-based model, and the velocity and direction estimation of a subsequent frame of the video data.

11. A system for continuously tracking humans in an area, the system comprising:

a processing circuitry; and a memory communicatively coupled to the processing circuitry, wherein the memory stores processor-executable instructions, which, on execution, causes the processing circuitry to:

receive video data of an area from a plurality of overhead cameras, wherein the plurality of overhead cameras comprises a first overhead camera and a second overhead camera, the first overhead camera comprises a first Field of View (FoV) and the second overhead camera comprises a second (FoV);

detect presence of one or more humans in the first FoV through object detection and classification models;

assign a unique global identity (ID) for each of the one or more humans in the first FOV; and reassign the unique global ID for each of the one or more humans when each of the one or more humans moves from the first FoV to the second FoV through an overlapping region between the first FOV and the second FoV using a weighted combination of a resource assignment algorithm, intersection-over-union (IOU) based track detection, an appearance-based model, and velocity and direction estimation of a subsequent frame of the video data, wherein the overlapping region corresponds to a region of intersection between the first FoV and the second FoV; and continuously track, in real-time, each of the one or more humans in the area through the unique global ID.

12. The system of claim 11, wherein the processor-executable instructions further cause the processing circuitry to:

generate a plurality of homograph matrices corresponding to the first overhead camera and the second overhead camera, wherein each of the plurality of homograph matrices comprises a representation of the first FoV and the second FoV;

combine the plurality of homograph matrices to obtain a combined homograph matrix; and present, in real-time, each of the detected one or more humans on the combined homograph matrix using homographic transformation.

13. The system of claim 12, wherein the processor-executable instructions further cause the processing circuitry to detect the presence of one or more humans, by:

identifying a head of each of the one or more humans and an associated head bounding box using the object detection and classification models, wherein the head bounding box is presented on the combined homograph matrix;

identifying a person corresponding to each of the one or more humans and an associated person bounding box using the object detection and classification models, wherein the person bounding box is presented on the combined homograph matrix; and associating the head with the person when a centroid of the head bounding box is within the person bounding box on the combined homograph matrix, wherein each of the head bounding box and the person bounding box is dynamically adjustable based on motion of an associated human of the one or more humans.

14. The system of claim 11, wherein the processor-executable instructions further cause the processing circuitry to identify a set of key points corresponding to each of the one or more humans using the appearance-based model.

15. The system of claim 11, wherein the processor-executable instructions further cause the processing circuitry to assign a local ID to each of the detected one or more humans in the first FoV and the second FoV using a Computer Vision (CV) algorithm, wherein the local ID in the first FoV is different from the local ID in the second FoV for each of the detected one or more humans.

16. The system of claim 15, wherein the processor-executable instructions further cause the processing circuitry to store attributes of each of the one or more humans, wherein the attributes comprise spatial attributes and temporal attributes.

17. The system of claim 16, wherein the processor-executable instructions further cause the processing circuitry to:

identify an ambiguity while continuously tracking each human of the one or more humans, wherein the ambiguity corresponds to one of:

the human within a proximity threshold with another of the one or more humans, or loss of the local ID of the human due to an error or failure of the CV algorithm; and resolve the ambiguity using the stored attributes.

18. The system of claim 17, wherein the processor-executable instructions further cause the processing circuitry to resolve the ambiguity, when the ambiguity corresponds to the loss of the local ID of the human, by:

assigning a new local ID to the human; and reassigning the unique global ID corresponding to the human using the stored attributes.

19. The system of claim 11, wherein each of the plurality of overhead cameras is mounted vertically.

20. The system of claim 11, wherein to continuously track in real-time, each of the one or more humans in the area, the processor-executable instructions further cause the processing circuitry to:

track each of the one or more humans based on the unique global ID when each of the one or more humans is in a non-overlapping region, using a combination of the IOU based track detection, the appearance-based model, and the velocity and direction estimation of a subsequent frame of the video data; and reassign the unique global ID for each of the one or more humans when each of the one or more humans moves through the overlapping region, using the weighted combination of the resource assignment algorithm, the IOU based track detection, the appearance-based model, and the velocity and direction estimation of a subsequent frame of the video data.

* * * * *